United States Patent
Von Arx et al.

(10) Patent No.: US 6,748,646 B2
(45) Date of Patent: Jun. 15, 2004

(54) METHOD OF MANUFACTURING A MOLDED HEATING ELEMENT ASSEMBLY

(75) Inventors: Theodore Von Arx, La Crescent, MN (US); Keith Laken, Winona, MN (US); John W. Schlesselman, Fountain City, WI (US); Ronald E. Papenfuss, Winona, MN (US)

(73) Assignee: Watlow Polymer Technologies, Winona, MN (US)

( * ) Notice: Subject to any disclaimer, the term of this patent is extended or adjusted under 35 U.S.C. 154(b) by 0 days.

(21) Appl. No.: 10/080,047

(22) Filed: Feb. 21, 2002

(65) Prior Publication Data

US 2002/0088111 A1 Jul. 11, 2002

Related U.S. Application Data

(62) Division of application No. 09/544,873, filed on Apr. 7, 2000.

(51) Int. Cl.⁷ .................. H01C 17/02; H01C 17/28; H05B 3/00
(52) U.S. Cl. .............. 29/613; 29/611; 29/619; 29/621; 219/438
(58) Field of Search .................. 29/613, 611, 619, 29/621, 856, 857, 858; 219/438, 386, 521

(56) References Cited

U.S. PATENT DOCUMENTS

| | | |
|---|---|---|
| 579,611 A | 3/1897 | Smith |
| 1,043,922 A | 11/1912 | Gold .................. 219/523 |
| 1,046,465 A | 12/1912 | Hoyt |
| 1,058,270 A | 4/1913 | Stephens .............. 219/217 |
| 1,281,157 A | 10/1918 | Hadaway, Jr. |
| 1,477,602 A | 12/1923 | Simon |
| 1,674,488 A | 6/1928 | Tang |
| 1,987,119 A | 1/1935 | Long .................... 219/39 |

(List continued on next page.)

FOREIGN PATENT DOCUMENTS

| | | |
|---|---|---|
| DE | 35 12 659 A | 9/1986 |
| DE | 3512659 | 10/1986 |
| DE | 38 36 387 C1 | 5/1990 |
| FR | 2 737 380 | 1/1997 |
| GB | 14562 | of 1913 |
| GB | 1070849 | 6/1967 |
| GB | 1325084 | 8/1973 |
| GB | 1498792 | 1/1978 |
| GB | 2244898 | 12/1999 |
| JP | 53-134245 | 11/1978 |
| JP | 3-129694 | 6/1991 |
| JP | 07 211438 A | 11/1995 |

OTHER PUBLICATIONS

"Polymers", *Guide to Selecting Engineered Materials*, a special issue of *Advanced Materials & Processes*, Metals Park, OH, ASM International, 1989, pp. 92–93.

"Makroblend Polycarbonate Blend, Tedur Polyphenylene Sulfide", *Machine Design: Basics of Design Engineering*, Cleveland, OH, Penton Publishing, Inc., Jun. 1991, pp. 820–821, 863, 866–867.

(List continued on next page.)

*Primary Examiner*—Carl J. Arbes
*Assistant Examiner*—Thiem D Phan
(74) *Attorney, Agent, or Firm*—Duane Morris LLP

(57) ABSTRACT

A heated element assembly and method of manufacturing heated element assemblies is provided. The heated element assembly including a first and second molded sections shaped to mate with each other is provided. A resistance heating element is secured between the first and second molded sections by an interference fit. The resistance heating element includes a piercable supporting substrate and a resistance wire sewn thereon. The resistance wire is disposed in a predetermined circuit path which is substantially encompassed by the first and second molded sections. The resistance heating element is easily fixed in a position between the first and second molded sections and is capable of providing heat on vertical, horizontal and contoured surfaces.

22 Claims, 25 Drawing Sheets

U.S. PATENT DOCUMENTS

| | | | |
|---|---|---|---|
| 1,992,593 A | 2/1935 | Whitney | 219/46 |
| 2,104,848 A | 1/1938 | Clark | 200/137 |
| 2,146,402 A | 2/1939 | Morgan | 219/523 |
| 2,202,095 A | 5/1940 | Delhaye et al. | 219/217 |
| 2,255,527 A | 9/1941 | Locke | 110/29 |
| 2,274,445 A | 2/1942 | Greer | 219/38 |
| 2,357,906 A | 9/1944 | Osterheld | 202/67 |
| 2,426,976 A | 9/1947 | Taulman | 219/19 |
| 2,456,343 A | 12/1948 | Tuttle | 201/67 |
| 2,464,052 A | 3/1949 | Numrich | 219/38 |
| 2,593,087 A | 4/1952 | Baggett | 219/217 |
| 2,593,459 A | 4/1952 | Johnson | 219/39 |
| 2,710,909 A | 6/1955 | Logan et al. | 219/46 |
| 2,719,907 A | 10/1955 | Combs | 219/46 |
| 2,804,533 A | 8/1957 | Nathanson | 219/34 |
| 2,889,439 A | 6/1959 | Musgrave | 219/19 |
| 2,938,992 A | 5/1960 | Crump | 219/46 |
| 3,061,501 A | 10/1962 | Dittman et al. | 156/250 |
| 3,173,419 A | 3/1965 | Dubilier et al. | 128/399 |
| 3,191,005 A | 6/1965 | Cox | 219/528 |
| 3,201,738 A | 8/1965 | Mitoff | 338/238 |
| 3,211,203 A | 10/1965 | Creed et al. | 146/81 |
| 3,238,489 A | 3/1966 | Hay | 388/250 |
| 3,268,846 A | 8/1966 | Morey | 338/212 |
| 3,296,415 A | 1/1967 | Eisler | 219/385 |
| 3,352,999 A | 11/1967 | Macoicz et al. | 219/321 |
| 3,374,338 A | 3/1968 | Morey | 219/529 |
| 3,385,959 A | 5/1968 | Ames et al. | |
| 3,496,517 A | 2/1970 | Walter | 339/18 |
| 3,535,494 A | 10/1970 | Armbruster | 219/528 |
| 3,564,589 A | 2/1971 | Arak | 219/331 |
| 3,573,430 A | 4/1971 | Eisler | 219/385 |
| 3,596,057 A | 7/1971 | Arntz et al. | 219/354 |
| 3,597,591 A | 8/1971 | Van Derlip | 219/528 |
| 3,614,386 A | 10/1971 | Hepplewhite | 219/312 |
| 3,621,566 A | 11/1971 | Welsh | 29/610 |
| 3,623,471 A | 11/1971 | Bogue et al. | 126/263.01 |
| 3,648,659 A | 3/1972 | Jones | 119/1 |
| 3,657,516 A | 4/1972 | Fujihara | 219/345 |
| 3,657,517 A | 4/1972 | Hoyt | 219/535 |
| 3,678,248 A | 7/1972 | Ticault et al. | 219/525 |
| 3,683,361 A | 8/1972 | Salzwedel | 338/322 |
| 3,686,472 A | 8/1972 | Harris | 219/213 |
| 3,707,618 A * | 12/1972 | Zeitlin et al. | 219/336 |
| 3,725,645 A * | 4/1973 | Shevlin | 219/521 |
| 3,774,299 A | 11/1973 | Sato et al. | 29/611 |
| 3,781,526 A * | 12/1973 | Damron | 219/538 |
| 3,806,701 A * | 4/1974 | Scott | 219/438 |
| 3,808,403 A | 4/1974 | Kanaya et al. | 219/528 |
| 3,831,129 A * | 8/1974 | Frey | 339/19 |
| 3,859,504 A | 1/1975 | Motokawa et al. | 219/528 |
| 3,860,787 A * | 1/1975 | Strobach | 219/336 |
| 3,875,373 A | 4/1975 | Lowrey et al. | 219/457 |
| 3,878,362 A * | 4/1975 | Stinger | 219/528 |
| 3,888,711 A | 6/1975 | Breitner | 156/93 |
| 3,900,654 A | 8/1975 | Stinger | 428/214 |
| 3,908,749 A * | 9/1975 | Williams | 165/2 |
| 3,927,300 A * | 12/1975 | Wada et al. | 219/381 |
| 3,933,550 A | 1/1976 | Erwin | 156/85 |
| 3,943,328 A * | 3/1976 | Cunningham | 219/335 |
| 3,952,182 A * | 4/1976 | Flanders | 219/309 |
| 3,968,348 A * | 7/1976 | Stanfield | 219/535 |
| 3,974,358 A * | 8/1976 | Goltsos | 219/387 |
| 3,976,855 A * | 8/1976 | Altmann et al. | 219/532 |
| 3,985,928 A * | 10/1976 | Watanabe et al. | 428/273 |
| 3,987,275 A * | 10/1976 | Hurko | 219/461 |
| 4,021,642 A * | 5/1977 | Fields, Jr. | 219/391 |
| 4,038,519 A | 7/1977 | Foucras | 219/301 |
| 4,046,989 A * | 9/1977 | Parise et al. | 219/437 |
| 4,055,526 A | 10/1977 | Kiyokawa et al. | 264/22 |
| 4,058,702 A * | 11/1977 | Jerles | 219/321 |
| 4,060,710 A | 11/1977 | Reuter et al. | 219/548 |
| 4,068,115 A * | 1/1978 | Mack et al. | 219/386 |
| 4,083,355 A * | 4/1978 | Schwank | 126/39 J |
| 4,094,297 A | 6/1978 | Ballentine | 126/39 J |
| 4,102,256 A | 7/1978 | John et al. | 99/372 |
| 4,112,410 A | 9/1978 | Wrob et al. | 338/243 |
| 4,117,311 A | 9/1978 | Sturm | 219/544 |
| 4,119,834 A | 10/1978 | Losch | 392/418 |
| 4,152,578 A | 5/1979 | Jacobs | 219/336 |
| 4,158,078 A | 6/1979 | Egger et al. | 428/102 |
| 4,176,274 A | 11/1979 | Lippera | 219/522 |
| 4,186,294 A | 1/1980 | Bender | 219/527 |
| 4,201,184 A | 5/1980 | Scheidler et al. | 126/39 J |
| 4,217,483 A | 8/1980 | Vogel et al. | 219/541 |
| 4,224,505 A | 9/1980 | Sturm | 219/544 |
| 4,233,495 A | 11/1980 | Scoville et al. | 219/386 |
| 4,245,149 A | 1/1981 | Fairlie | 219/528 |
| 4,250,397 A | 2/1981 | Gray et al. | 392/435 |
| 4,272,673 A | 6/1981 | Semanaz et al. | 219/544 |
| 4,294,643 A | 10/1981 | Tadewald | 156/293 |
| 4,296,311 A | 10/1981 | Hagglund et al. | 219/464 |
| 4,304,987 A | 12/1981 | van Konynenburg | 219/553 |
| 4,313,053 A | 1/1982 | Sturm | 219/544 |
| 4,313,777 A | 2/1982 | Buckley et al. | 156/272 |
| 4,321,296 A | 3/1982 | Rougier | 428/212 |
| 4,326,121 A | 4/1982 | Welsby et al. | 219/523 |
| 4,334,146 A | 6/1982 | Sturm | 219/492 |
| 4,337,182 A | 6/1982 | Needham | 524/609 |
| 4,346,277 A | 8/1982 | Wojtecki et al. | 219/528 |
| 4,346,287 A | 8/1982 | Desloge | 219/541 |
| 4,349,219 A | 9/1982 | Sturm | 285/21 |
| 4,354,096 A | 10/1982 | Dumas | 219/523 |
| 4,358,552 A | 11/1982 | Shinohara et al. | 523/443 |
| 4,364,308 A | 12/1982 | John et al. | 99/351 |
| 4,375,591 A | 3/1983 | Sturm | 219/544 |
| 4,387,293 A | 6/1983 | Grice et al. | 219/529 |
| 4,388,607 A | 6/1983 | Toy et al. | 338/22 SD |
| 4,390,551 A | 6/1983 | Swartley et al. | 426/107 |
| 4,419,567 A | 12/1983 | Murphy et al. | 219/336 |
| 4,429,215 A | 1/1984 | Sakai et al. | 219/528 |
| 4,436,988 A | 3/1984 | Blumenkranz | 219/544 |
| 4,482,239 A | 11/1984 | Hosono et al. | 355/3 |
| 4,493,985 A | 1/1985 | Keller | 219/535 |
| 4,501,951 A | 2/1985 | Benin et al. | 219/243 |
| 4,530,521 A | 7/1985 | Nyffeler et al. | 285/21 |
| 4,534,886 A | 8/1985 | Kraus et al. | 252/502 |
| 4,540,479 A | 9/1985 | Sakurai et al. | 204/427 |
| 4,606,787 A | 8/1986 | Pelligrino | 156/632 |
| 4,633,063 A | 12/1986 | Willis | 219/243 |
| 4,640,226 A | 2/1987 | Liff | 119/1 |
| 4,641,012 A | 2/1987 | Roberts | 219/331 |
| 4,658,121 A | 4/1987 | Horsma et al. | 219/553 |
| 4,687,905 A | 8/1987 | Cunningham et al. | 219/336 |
| 4,703,150 A | 10/1987 | Kunnecke et al. | 219/535 |
| 4,707,590 A | 11/1987 | Lefebvre | 219/523 |
| 4,725,717 A * | 2/1988 | Harrison | 219/528 |
| 4,730,148 A | 3/1988 | Nakata | 315/397 |
| 4,751,528 A | 6/1988 | Spehrley, Jr. et al. | 346/140 |
| 4,756,781 A | 7/1988 | Etheridge | 156/85 |
| 4,762,980 A | 8/1988 | Insley | 219/307 |
| 4,784,054 A | 11/1988 | Karos et al. | 99/483 |
| 4,797,537 A | 1/1989 | Berthelius et al. | 219/528 |
| 4,845,343 A | 7/1989 | Aune et al. | 219/545 |
| 4,860,434 A | 8/1989 | Louison et al. | 29/611 |
| 4,865,014 A | 9/1989 | Nelson | 126/361 |
| 4,865,674 A | 9/1989 | Durkin | 156/158 |
| 4,866,252 A | 9/1989 | Van Loo et al. | 219/535 |
| 4,904,845 A | 2/1990 | Wonka | 219/280 |
| 4,911,978 A | 3/1990 | Tsubone et al. | 428/317.9 |
| 4,913,666 A | 4/1990 | Murphy | 439/709 |

| | | | |
|---|---|---|---|
| 4,927,999 A | 5/1990 | Hanselka | 219/535 |
| 4,948,948 A | 8/1990 | Lesage | 219/329 |
| 4,956,138 A | 9/1990 | Barfield | 264/129 |
| 4,970,528 A | 11/1990 | Beaufort et al. | 346/25 |
| 4,972,197 A | 11/1990 | McCauley et al. | 343/704 |
| 4,982,064 A | 1/1991 | Hartman et al. | 219/727 |
| 4,983,814 A | 1/1991 | Ohgushi et al. | 219/545 |
| 4,986,870 A | 1/1991 | Frohlich | 156/382 |
| 4,993,401 A | 2/1991 | Diekmann et al. | 126/39 |
| 5,003,693 A | 4/1991 | Atkinson et al. | 29/849 |
| 5,013,890 A | 5/1991 | Gamble | 392/497 |
| 5,021,805 A | 6/1991 | Imaizumi et al. | 346/76 R |
| 5,023,433 A | 6/1991 | Gordon | 219/548 |
| 5,038,458 A | 8/1991 | Wagoner et al. | 29/593 |
| 5,041,846 A | 8/1991 | Vincent et al. | 346/25 |
| 5,051,275 A | 9/1991 | Wong | 427/58 |
| 5,066,852 A | 11/1991 | Willbanks | 219/544 |
| 5,068,518 A | 11/1991 | Yasuda | 219/549 |
| 5,073,320 A | 12/1991 | Sterzel | 264/101 |
| 5,111,025 A | 5/1992 | Barma et al. | 29/217 |
| 5,113,480 A | 5/1992 | Murphy et al. | 392/501 |
| 5,129,033 A | 7/1992 | Ferrara et al. | 392/447 |
| 5,136,143 A | 8/1992 | Kutner et al. | 219/544 |
| 5,155,800 A | 10/1992 | Rezabek et al. | 382/503 |
| 5,162,634 A | 11/1992 | Kusaka | 219/216 |
| 5,184,969 A | 2/1993 | Sharpless et al. | 445/24 |
| 5,208,080 A | 5/1993 | Gajewski et al. | 428/1 |
| 5,221,419 A | 6/1993 | Beckett | 156/630 |
| 5,221,810 A | 6/1993 | Spahn | 102/475 |
| 5,237,155 A | 8/1993 | Hill | 219/544 |
| 5,252,157 A | 10/1993 | Inhofe, Jr. | 156/158 |
| 5,255,595 A | 10/1993 | Higgins | 99/378 |
| 5,255,942 A | 10/1993 | Kenworthy | 285/21 |
| 5,271,085 A | 12/1993 | Carballo | 392/444 |
| 5,287,123 A | 2/1994 | Medin et al. | 346/140 R |
| 5,293,446 A | 3/1994 | Owens et al. | 392/446 |
| 5,300,760 A | 4/1994 | Batliwalla et al. | 219/549 |
| 5,302,807 A | 4/1994 | Zhao | 219/211 |
| 5,304,778 A | 4/1994 | Dasgupta et al. | 219/270 |
| 5,313,034 A | 5/1994 | Grimm | 156/274.2 |
| 5,389,184 A | 2/1995 | Jacaruso et al. | 156/378 |
| 5,397,873 A | 3/1995 | Stoops et al. | 219/450 |
| 5,406,316 A | 4/1995 | Schwiebert et al. | 347/18 |
| 5,406,321 A | 4/1995 | Schwiebert et al. | 347/102 |
| 5,408,070 A | 4/1995 | Hyllberg | 392/503 |
| 5,453,599 A | 9/1995 | Hall, Jr. | 219/544 |
| 5,461,408 A | 10/1995 | Giles et al. | 347/102 |
| 5,476,562 A | 12/1995 | Inhofe, Jr. | 156/156 |
| 5,477,033 A | 12/1995 | Bergholtz | 219/549 |
| 5,497,883 A | 3/1996 | Monetti | 206/545 |
| 5,500,667 A | 3/1996 | Schwiebert et al. | 347/102 |
| 5,520,102 A | 5/1996 | Monetti | 99/483 |
| 5,521,357 A | 5/1996 | Lock et al. | 219/543 |
| 5,571,435 A | 11/1996 | Needham | 219/544 |
| 5,572,290 A | 11/1996 | Ueno et al. | 399/329 |
| 5,581,289 A | 12/1996 | Firl et al. | 347/102 |
| 5,582,754 A * | 12/1996 | Smith et al. | 219/438 |
| 5,586,214 A | 12/1996 | Eckman | 392/503 |
| 5,618,065 A | 4/1997 | Akiyama | 285/21.2 |
| 5,619,240 A | 4/1997 | Pong et al. | 347/103 |
| 5,625,398 A | 4/1997 | Milkovits et al. | 347/104 |
| 5,633,668 A | 5/1997 | Schwiebert et al. | 347/102 |
| 5,678,725 A * | 10/1997 | Yamada et al. | 220/592.21 |
| 5,691,756 A | 11/1997 | Rise et al. | 347/102 |
| 5,697,143 A | 12/1997 | Barfield | 29/611 |
| 5,703,998 A | 12/1997 | Eckman | 392/340 |
| 5,708,251 A | 1/1998 | Naveh | 219/121.66 |
| 5,714,738 A | 2/1998 | Hauschulz et al. | 219/535 |
| 5,779,870 A | 7/1998 | Seip | 205/77 |
| 5,780,817 A | 7/1998 | Eckman et al. | 219/458 |
| 5,780,820 A | 7/1998 | Komyoji et al. | 219/543 |
| 5,781,412 A | 7/1998 | De Sorgo | 361/704 |
| 5,806,177 A | 9/1998 | Hosomi et al. | 29/846 |
| 5,811,769 A | 9/1998 | Schiffmann et al. | 219/762 |
| 5,822,675 A | 10/1998 | Paquet et al. | 428/561 |
| 5,824,996 A | 10/1998 | Kochman et al. | 219/529 |
| 5,829,171 A | 11/1998 | Weber et al. | 36/93 |
| 5,835,679 A | 11/1998 | Eckman et al. | 392/503 |
| 5,856,650 A | 1/1999 | Rise et al. | 219/216 |
| 5,880,435 A | 3/1999 | Bostic | 219/387 |
| 5,883,364 A | 3/1999 | Frei et al. | 219/535 |
| 5,902,518 A | 5/1999 | Khazai et al. | 252/511 |
| 5,925,275 A | 7/1999 | Lawson et al. | 219/543 |
| 5,930,459 A | 7/1999 | Eckman | 392/503 |
| 5,932,124 A | 8/1999 | Miller et al. | 219/213 |
| 5,940,895 A | 8/1999 | Wilson et al. | 4/237 |
| 5,942,140 A | 8/1999 | Miller et al. | 219/213 |
| 5,947,012 A | 9/1999 | Ewald et al. | 99/374 |
| 5,954,977 A | 9/1999 | Miller et al. | 219/201 |
| 5,961,869 A | 10/1999 | Irgens | 219/549 |
| 5,966,501 A | 10/1999 | Miller et al. | 392/458 |
| 5,981,911 A * | 11/1999 | Miller et al. | 219/387 |
| 6,015,965 A | 1/2000 | Miller et al. | 219/213 |
| 6,018,141 A | 1/2000 | Miller et al. | 219/221 |
| 6,037,574 A | 3/2000 | Lanham et al. | 219/544 |
| 6,056,157 A | 5/2000 | Gehl et al. | 222/94 |
| 6,089,406 A | 7/2000 | Feldner | 222/103 |
| 6,137,098 A | 10/2000 | Moseley et al. | 219/727 |
| 6,145,787 A | 11/2000 | Rolls | 244/134 R |
| 6,147,332 A | 11/2000 | Holmberg et al. | 219/526 |
| 6,147,335 A | 11/2000 | Von Arx et al. | 219/544 |
| 6,150,635 A | 11/2000 | Hannon et al. | 219/386 |
| 6,162,385 A | 12/2000 | Grosse-Puppendahl et al. | 264/250 |
| 6,229,123 B1 | 5/2001 | Kochman et al. | 219/549 |

OTHER PUBLICATIONS

European Search Report, Jul. 13, 1998.

"At HEI, Engineering is our Middle Name", Heaters Engineering, Inc., Mar. 2, 1995.

"Flexibility and cost Savings with Rope Elements", Heating Engineers, Inc. Aug. 1998.

Desloge Engineering Col, Letter to Lou Steinhauser dated Feb. 19, 1997.

Immersion Heaters Oil and Water, p. 11 (19___)v.

Special Purpose Flange Heaters, p. 58 (19___).

Lakewood Trade Literature entitled "Oil–Filled Radiator Heater" (19___).

Encon Drawing Part Nos. 02–06–480 & 02–06–481 (19___).

Encon Drawing No. 500765 (Jun. 10, 1987).

Vulcan Electric Company Trade Literature entitled "Bushing Immersion Heaters", 1983.

Trade Literature "Euro–Burner Solid Disc Conversion Burners" Energy Convertors, Inc., Dallas, PA 1991.

"Polymers," *Guide to Selecting Engineering Materials*, a special issue of Advanced Materials& Presses, Metals Park, OH, ASM International, 1990, pp. 32–33.

Machine Design, "Basics of Design Engineering", Jun. 1991, pp. 429–432, 551, 882–884.

Machine Design, "Basics of Design Engineering", Jun. 1994, pp 624–631.

Machine Design, May 18, 2000, 3 pages.

Carvill, Wm. T., "Prepreg Resins", Enginerred Materials Handbook, Vol 1, Composites pp. 139–142.

Thermoplastic Polyimide (TPI) Features, RTP Company's 4200 series compounds (4 pages).

World Headquarters, RTP Co, RTP 1300 Series Polyphenylene Sulfide Compounds, 1 page.

World Headquarters, RTP Co, RTP 2100 Series Polyetherimide Compounds, 1 page.

World Headquarters, RTP Co, RTP 3400 Series Liquid Crystal Polymer Compounds, 1 page.

World Headquarters, RTP Co, RTP 4200 Series Thermoplastic Polyimide Compounds, 1 page.

A.M. Wittenberg, "Pin Shorting Contact," Western Electric Technical Digest No. 60, Oct. 1980, p. 25.

International Search Report, Aug. 8, 2000.

Kronenberg, K.J., "Magnetic Water Treatment De–Mystified", Green Country Environmental Associates, LLC, pp 1–8 (Jan. 19, 2000).

International Search Report dated Nov. 21, 2001.

International Search Report dated Dec. 5, 2001.

* cited by examiner

METHOD OF MANUFACTURING A MOLDED HEATING ELEMENT ASSEMBLY

CROSS-REFERENCE TO RELATED APPLICATIONS

This application is a divisional application of U.S. patent application Ser. No. 09/544,873 of Theodore Von Ar, Keith Laken, John Schlesselman and Ronald Papenfuss, filed Apr. 7, 2000, entitled "Molded Assembly with Heating Element Captured Therein."

This application is related to U.S. application Ser. No. 09/369,779 of Theodore Von Arx, filed Aug. 6, 1999, entitled "Electrofusing of Thermoplastic Heating Elements and Elements Made Thereby"; U.S. application Ser. No. 09/416,731 of John Schlesselman and Ronald Papenfuss, filed Oct. 13, 1999. entitled "Heating Element Containing Sewn Resistance Material"; and U.S. application Ser. No. 09/275,161 of Theodore Von Arx, James Rutherford and Charles Eckman, filed Mar. 24, 1999, entitled "Heating Element Suitable for Preconditioning Print Media," now U.S. Pat. No. 6,233,398, which are all hereby incorporated by reference. This application is also related to U.S. Provisional Application No. 60/177,330, filed Jan. 21, 2000, entitled "Improved Cooking Grill," which is also hereby incorporated by reference.

FIELD OF THE INVENTION

This invention relates to electrical resistance heating elements, and more particularly, to molded heating assemblies including heating elements.

BACKGROUND OF THE INVENTION

Electrical resistance heating elements are available in many forms. A typical construction includes a pair of terminal pins brazed to the ends of a Ni—Cr coil, which is then axially disposed through a U-shaped tubular metal sheath. The resistance coil is insulated from the metal sheath by a powdered ceramic material, usually magnesium oxide. While such conventional heating elements have been the workhorse for the heating element industry for decades, there have been some widely-recognized deficiencies. For example, galvanic currents occurring between the metal sheath and any exposed metal surfaces of a hot water tank can create corrosion of the various anodic metal components of the system. The metal sheath of the heating element, which is typically copper or copper alloy, also attracts lime deposits from the water, which can lead to premature failure of the heating element. Additionally, the use of brass fittings and copper tubing has become increasingly more expensive as the price of copper has increased over the years. What's more, metal tubular elements present limited design capabilities, since their shape can not be significantly altered without losing performance.

As an alternative to metal elements, polymeric heating elements have been designed, such as those disclosed in U.S. Pat. No. 5,586,214. The '214 patent describes a process of making a polymeric heater in which an inner mold is used having a plurality of threaded grooves for receiving a resistance wire. The assembly is first wound with a wire and thereafter injection molded with an additional coating of thermoplastic material, containing a large amount of ceramic powder for improving the thermal conductivity of the coating.

It has been discovered that injection molding a layer of thermoplastic material loaded with large amounts of ceramic powder can be difficult. The viscous polymeric material often fails to fill the mold details and can leave portions of resistance wire coil exposed. Additionally, there can be insufficient wetting between the over molded thermoplastic coating and the resistance wire, with minimal thermoplastic bonding between the inner mold and the over molded thermoplastic coating. This has led to failure of such elements during thermal cycling, since entrapped air and insufficient bonding create crack initiation sites. Crack initiation sites lead to stress cracks that can lead to shorts in emersion applications. Cracks and entrapped air also limit the heating element's ability to generate heat homogeneously, which tends to create hot and cold spots along the length of the element.

Efforts have been made to minimize hot and cold spots and insufficient bonding between layers of plastic materials having electrical resistance heaters disposed between their layers. In U.S. Pat. No. 5,389,184, for example, a pair of thermosetting composite structures are bonded together using a heating element containing a resistance heating material embedded within two layers of thermoplastic adhesive material. The two thermosetting components are permitted to cure, and then while applying pressure to the joint, electrical energy is passed through the heating element sufficient to heat the joint to above the melting temperature of the thermoplastic adhesive material. This heat fuses the layers of the thermoplastic adhesive to join the thermosetting materials together. The heating element remains within the joint after bonding and provides a mechanism to reheat the joint and reverse the bonding process in the field. While these procedures have met with some success, there remains a need for a less expensive, and more structurally sound, electrical resistance heating element.

The thermoplastic injection molding process has existed for several years. The plastic molding process has evolved to a point where the standard is high quality detailed, complex shapes, and smooth aesthetic surfaces. In addition, injection molding using plastic part tooling and molding equipment has evolved into a precise science capable of mass producing high quality plastic products.

Typical injection molding processes require that molten plastic be shot into a tool at an extreme high velocity. It is the interaction between the viscosity of the molten plastic, the molding pressure, and the tool geometry that creates a high quality, high detailed plastic part. Another common practice of injection molding incorporates the use of rigid inserts (i.e. insert molding) such as threaded bosses and ancillary mechanical parts. The required material fill velocity and mold pressure, however, are not conducive to accurate placement of element precursors within complex designs. The inability to overcome the adverse effects of mold flow on precursor element placement has limited molded heated part geometries to primarily flat shapes.

Therefore, along with the need for a less expensive, and more structurally sound, electrical resistance heating elements, there remains a need to implement element precursors into molded contoured shapes beyond geometries that are primarily flat surfaces.

SUMMARY OF THE INVENTION

The present invention comprises a heated element assembly and method of manufacturing heated element assemblies. The heated element assembly according to the present invention includes a first molded section and a second molded section shaped to mate with the first molded section. The assembly also includes a resistance heating element comprising a supporting substrate having an electrical resistance heating material fastened to the supporting substrate. The electrical resistance heating material forms a predetermined circuit path having a pair of terminal end portions. The first and second molded sections are connected to substantially encompass the circuit path such that the heating element is secured between the first and second molded sections by an interference fit.

The present invention provides several benefits while opening infinite design opportunities. Cost effective complex assembly shapes are easily formed while accurately positioning resistance heating elements. This allows for the ability to provide heat on horizontal planes, vertical planes, and along complex contoured shapes. The supporting substrate is also capable of functioning as a thermal buffer between the resistance heating material and a molded section. Additionally, the supporting substrate serves as a mechanical stress buffer between the resistance heating material and a selected polymer in a heated element assembly. Further, the seam formed between the molded sections allows air to be evacuated from the area formed between the molded sections and a hermetic seal to be formed at the seam, such as by electro-fusing, spin welding, sonic welding, hot air welding, vibration welding, diffusion bonding, or o-ring snap fitting the mated sections together. The heat distribution of a heated element assembly may also be improved by back-filling an inert gas, such as argon, into the area formed between the two mated sections before hermetically sealing the seam.

In another embodiment of the invention, the electrical resistance heating material of the resistance heating element is prevented from contacting the molded sections. The resistance heating element may include a second supporting substrate, and the electrical resistance heating material is fastened between the first and second supporting substrates. Alternatively, the resistance heating element may be suspended between the molded sections along the edges of the supporting substrate. By doing so, the molded sections are buffered by a supporting substrate and/or separation from the resistance heating material, allowing for the transfer of heat to the molded sections without compromising the integrity of the molded sections. This, in turn, permits the use of less heat resilient, but less expensive, polymers to construct the molded sections. Further, different supporting substrates or substrate thicknesses may be selected to bias generated heat to a selected molded sections. This provides for the ability to design and predict heat flow in heated element assemblies.

In still another embodiment of the invention, at least one of the molded sections includes a protrusion extending from a surface facing the resistance heating element. The protrusion contacts the resistance heating element and may extend to contact only the supporting substrate or substrates in order to further locally secure the heating element in a preselected location. Alternatively, the protrusion may contact the electrical resistance material and partially yield to the resistance material to secure the heating element in its selected position.

The invention also provides the ability to selectively control heat distribution through the design of the molded sections. The molded sections may have different thicknesses, be constructed of different materials or include different conductive additives, or a combinations thereof. This ability allows for a design to control the heat transfer and direct generated thermal energy in an application specific manner, such as for cooking, biological processing, or printing applications.

The above and other features of the present invention will be better understood from the following detailed description of the preferred embodiments of the invention which is provided in connection with the accompanying drawings.

A BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

The present invention provides molded heated element assemblies including resistance heating elements adapted to conform to assemblies of numerous different geometric shapes and sizes. As used herein, the following terms are defined:

"Substantially Encapsulating" means that at least 85 percent of the surface area of the designated member is provided with polymeric material, but does not necessarily mean that the coating is hermetic;

"Serpentine Path" means a path which has one or more curves for increasing the amount of electrical resistance material in a given volume of polymeric matrix, for example, for controlling the thermal expansion of the element;

"Melting Temperature" means the point at which a fusible substance begins to melt;

"Melting Temperature Range" means the temperature range over which a fusible substance starts to melt and then becomes a liquid or semi-liquid;

"Degradation Temperature" means the temperature at which a thermoplastic or thermosetting polymer begins to permanently lose its mechanical or physical properties because of thermal damage to the polymer's molecular chains;

"Evacuating" means reducing air or trapped air bubbles by, for example, vacuum or pressurized inert gas, such as argon, or by bubbling the gas through a liquid polymer.

"Fusion Bond" means the bond between two fusible members integrally joined, whereby the polymer molecules of one member mix with the molecules of the other. A Fusion Bond can occur, even in the absence of any direct or chemical bond between individual polymer chains contained within said members;

"Fused" means the physical flowing of a material, such as ceramic, glass, metal or polymer, hot or cold, caused by heat, pressure or both;

"Electrofused" means to cause a portion of a fusible material to flow and fuse by resistance heating;

"Stress Relief" means reducing internal stresses in a fusible material by raising the temperature of the material or material portion above its stress relief temperature, but preferably below its Heat Deflection Temperature.

Element Embodiment

Figure 1:
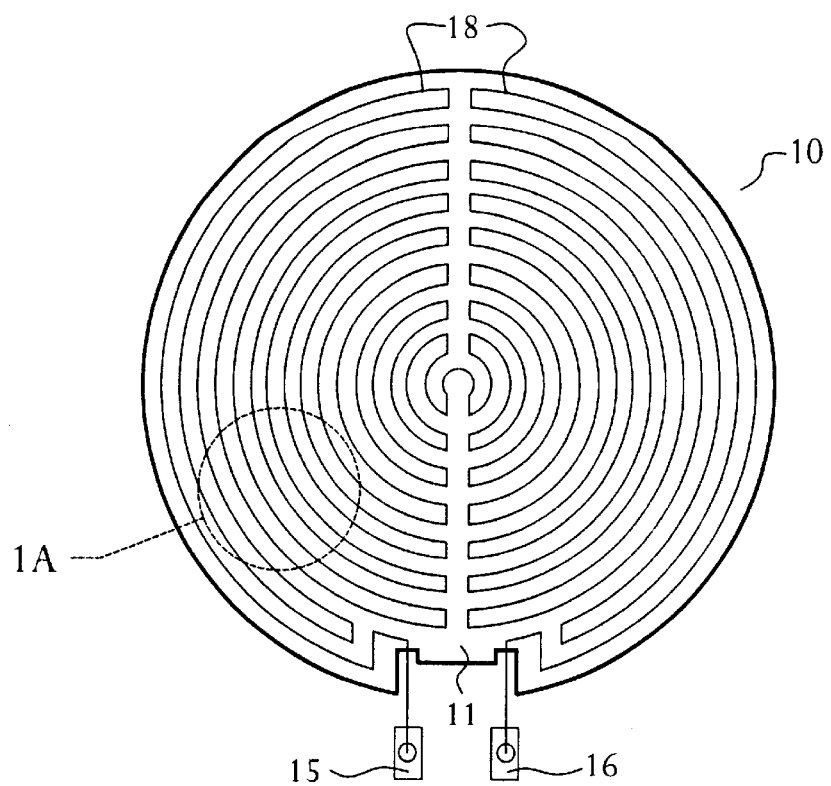
FIG. 1 is a front plan view of a preferred element precursor, including a resistance wire disposed in a circuit path on a supporting substrate and joined to a pair of electrical connectors.
Figure 1A:
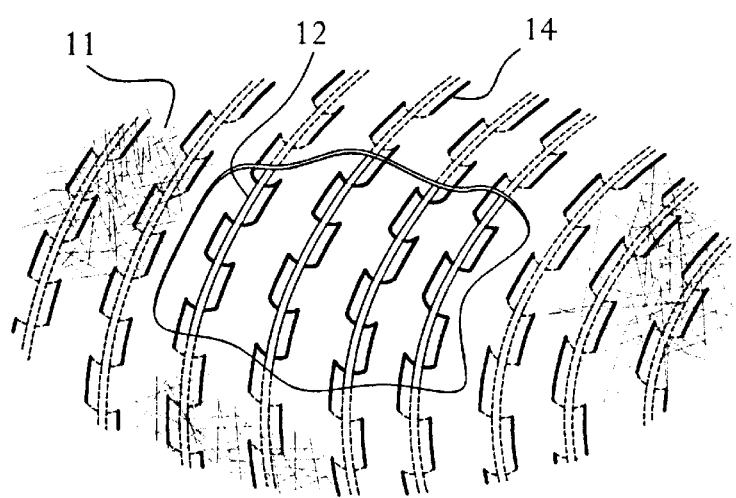
FIG. 1A is a front plan, enlarged view, of a portion of the element precursor of FIG. 1, showing the preferred cross-stitch attachment to the supporting substrate.
Figure 2:
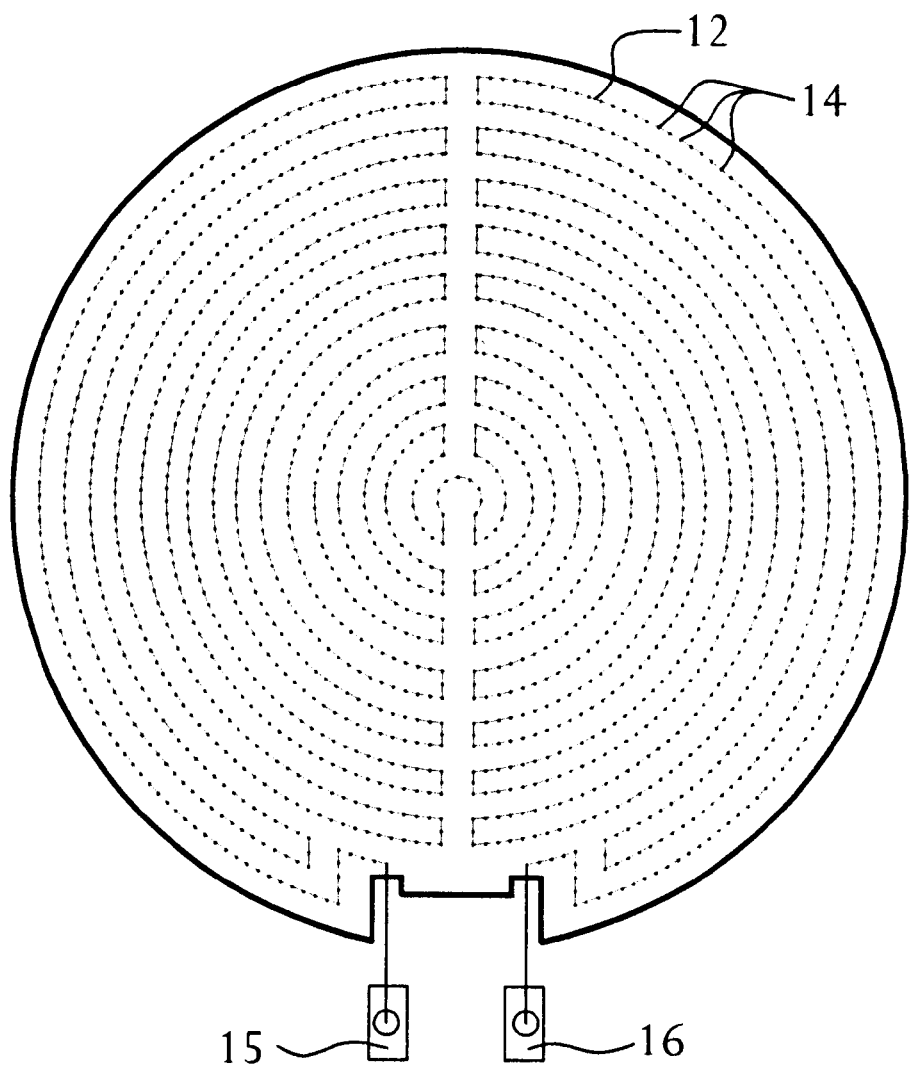
FIG. 2 is a rear plan view of the element.

With reference to the Figures, and particularly FIGS. 1, 1A and 2 thereof, there is shown a first embodiment of a element precursor 10 having a diameter of about 11 cm. The preferred element precursor 10 may include a regulating device for controlling electric current. Such a device can include, for example, a thermistor, or a thermocouple, for preventing overheating of the polymeric materials disclosed in this invention. The element precursors 10 of this invention can take on any number of shapes and sizes, including squares, ovals, irregular circumference shapes, tubes, cup shapes and containers. Sizes can range from less than one inch square to 21 in.×26 in. with a single sewing operation, and greater sizes can be available if multiple elements are joined together. Greater sizes are also available with continuous sowing where a substrate fed from a roll of substrate.

As shown in FIG. 1, the element precursor 10 includes a resistance wire 12 disposed in a helical pattern or circuit path 18. The ends of the resistance wire 12 are generally riveted, grommeted, brazed, clinched, compression fitted or welded to a pair of electrical connectors 15 and 16. One preferred circuit path of the heating element 25 of its invention is illustrated in FIGS. 1 and 2. The circuit includes a resistance heating material, which is ideally a resistance heating wire 12 wound into a serpentine path containing about 3–200 windings, or, a resistance heating material, such as ribbon a foil or printed circuit, or powdered conducting or semi-conducting metals, polymers, graphite, or carbon, or a conductive coating or ink. More preferably the resistance heating wire 12 includes a Ni—Cr alloy, although certain copper, steel, and stainless-steel alloys could be suitable. A positive temperature coefficient wire may also be suitable. The resistance heating wire 12 can be provided in separate parallel paths, or in separate layers. Whatever material is selected, it should be electrically conductive, and heat resistant.

Fusible and Polymeric Layers

A heating element may include fusible layers that are preferably polymeric, but can contain any heat resistant, thermally conductive and preferably non-electrically conductive materials, such as ceramics, (such as those discussed herein), clays, glasses, and semi-conductive materials, such as gallium arsenide or silicon. Additionally, cast or wrought metals, such as aluminum, copper, brass, zinc and tin, or combinations thereof, could be used, if the resistance wire or material is insulated in a coating such as glass, ceramic, or high temperature polymer.

Figure 5:
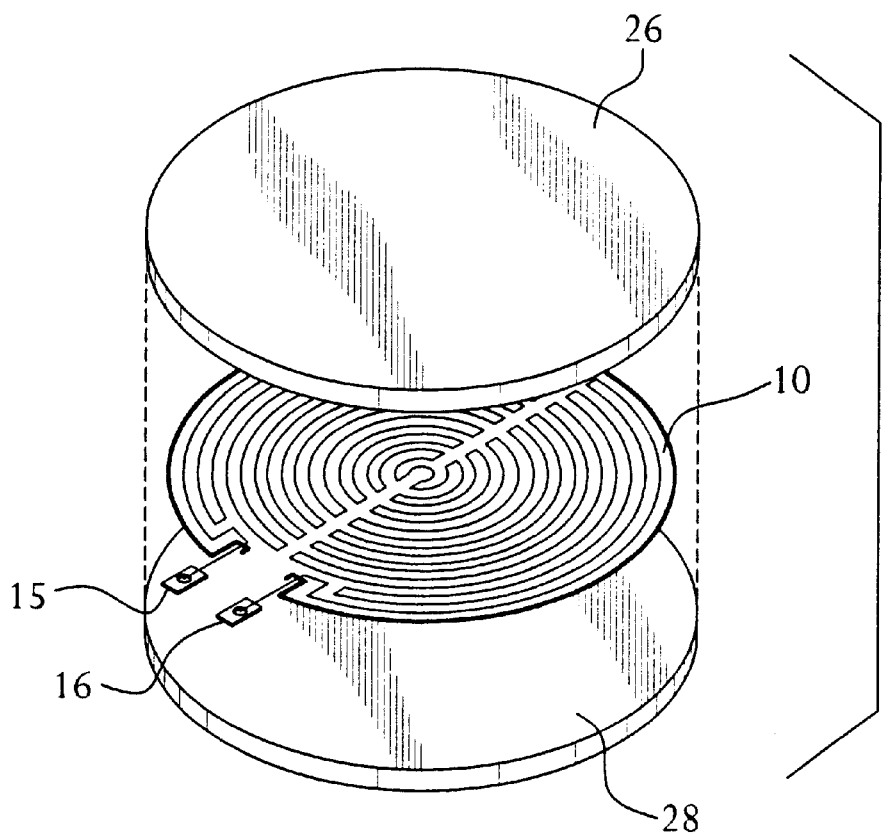
FIG. 5 is a top perspective and exploded view of the heating element described in FIG. 4.

Preferred polymeric layers, including top and bottom polymeric layers 26 and 28 of FIG. 5, are preferably made from a high-temperature polymeric resin including a melting or degradation temperature of greater than 93° C. (200° F.). High temperature polymers known to resist deformation and melting at operating temperatures of from about 75–200° C. are particularly useful for this purpose. Both thermoplastics and thermosetting polymers can be used. Good choices include polymeric materials and compositions that are injection moldable, since they are already known to behave well during melting and reforming operations. Preferred thermoplastic materials include, for example: fluorocarbons, polypropylene, polycarbonate, polyetherimide, polyether sulphone, polyaryl-sulphones, polyimides, and polyetheretherkeytones, polyphenylene sulfides, polyether sulphones, and mixtures and co-polymers of these thermoplastics. Preferred thermosetting polymers include epoxies, phenolics, and silicones. Liquid-crystal polymers can also be employed for improving high-temperature use. Also useful for the purposes of this invention are compression, prepregs, or sheet molding compounds of epoxy reinforced with about 5–60 wt % glass fiber. A variety of commercial epoxies are available which are based on phenol, bisphenol, aromatic diacids, aromatic polyamines and others, for example, Lytex 930, available from Quantum Composites, Midland, Mich. or THERMOCOMP, available from LNP Engineering Plastics Inc., Exton, Pa.

It is further understood that, although thermoplastic plastics are most desirable for fusible layers because they are generally heat-flowable, some thermoplastics, notably polytetraflouroethylene (PTFE) and ultra high-molecular-weight polyethylene (UHMWPE) do not flow under heat alone. Also, many thermoplastics are capable of flowing without heat, under mechanical pressure only. On the other hand, thermosetting polymers are usually heat-settable, yet many thermosetting plastics such as silicone, epoxy and polyester, can be set without being heated. Another thermosetting material, phenolic, must first be made to flow under heat, like a thermoplastic, before it can be heat-set.

As stated above, polymeric layers preferably also include reinforcing fibers, such as glass, carbon, aramid, steel, boron, silicon carbide, polyethylene, polyamide, or graphite fibers. The fibers can be disposed throughout the polymeric material in amounts of about 5–75 wt % prior to molding or forming the final heating element 25, and can be provided in single filament, multifilament thread, yarn, roving, non-woven or woven fabric.

In addition to reinforcing fibers, this invention contemplates the use of thermally conducting, preferably non-electrically conducting, additives in amounts of about 5–80 wt %. The thermally-conducting additives desirably include ceramic powder such as, for example, $Al_2O_3$, $MgO$, $ZrO_2$, Boron nitride, silicon nitride, $Y_2O_3$, $SiC$, $SiO_2$, $TiO_2$, etc., or a thermoplastic or thermosetting polymer which is more thermally conductive than the polymer suggested to be used with the top and bottom polymeric layers 26 and 28. For example, small amounts of liquid-crystal polymer or polyphenylene sulfide particles can be added to a less expensive base polymer such as epoxy or polyvinyl chloride, to improve thermal conductivity. Alternatively copolymers, alloys, blends, and interpenetrating polymer networks (IPNs) could be employed for providing improved thermal conductivity, better resistance to heat cycles and creep.

Substrates

As used herein, the term "supporting substrate" refers to the base material on which the resistance material, such as wires, are applied. The supporting substrate 11 of this invention should be capable of being pierced, penetrated, or surrounded, by a sewing needle for permitting the sewing operation. Other than this mechanical limitation, the substrates of this invention can take on many shapes and sizes. Flat flexible substrates can be used for attaching electrical resistance wire with a thread, prior to bending the substrate in a mold and overmolding with a thermoplastic or thermosetting material. Non-plastic materials, such as ceramics, glasses, semiconductive materials, and metals, can be employed so long as they have a piercable cross-sectional thickness, e.g., less than 10–20 mil, or a high degree of porosity or openings therethrough, such as a grid, scrim, woven or nonwoven fabric, for permitting the sewing needle of this invention to form an adequate stitch. The supporting substrate 11 of this invention need not necessarily contribute to the mechanical properties of the final heating element 25, but may contain high strength fibers such as those described above for reinforcing the polymeric layers 26 and 28 of this invention. Such fibers could contain carbon, glass, aramid fibers melt-bonded or joined with an adhesive to form a woven or non-woven mat. Alternatively, the supporting substrate 11 of this invention may contain ordinary, natural, or synthetic fibers, such as cotton, wool, silk, rayon, nylon, polyester, polypropylene, polyethylene, etc. The supporting substrate may also comprise a synthetic fiber such as Kevlar or carbon fibers that have good thermal uniformity and strength. The advantage of using ordinary textile fibers, is that they are available in many thicknesses and textures and can provide an infinite variety of chemistry, porosity and melt-bonding ability. The fibers of this invention, whether they be plastic, natural, ceramic or metal, can be woven, or spun-bonded to produce non-woven textile fabrics, alternatively, clay, such as modeling clay can be used and later fired to provide an element precursor after an electrical resistance material is bonded to the clay surface.

Specific examples of supporting substrates 11 useful in this invention include non-woven fiberglass mats bonded with an adhesive or sizing material such as model 8440 glass mat available from Johns Manville, Inc. Additional substrates can include polymer impregnated fabric, such as raw printed circuit board laminate, polymer or organic fabric weaves, such as those containing nylon, rayon, hemp or rubber, etc., porous ceramic wafers, porous mica-filled plate or sheet, and thermoplastic or thermosetting sheet film material. In one preferred embodiment, the supporting substrate 11 contains a polymeric resin which is also used in either the top polymeric layer 26 or bottom polymeric layer 28, or both. Such a resin can be provided in woven or non-woven fibrous form, or in thin sheet material having a thickness of 20 mil. or less. Thermosetting and thermoplastic material can be used for the supporting substrate 11 which will melt-bond or liquefy in the subsequent molding operation with the polymeric material of the top or bottom polymeric layers 26 and 28, so as to blend into a substantially uniform composition, preferably without a visible seam at 10×magnification.

Sewing Operation

Figure 3:
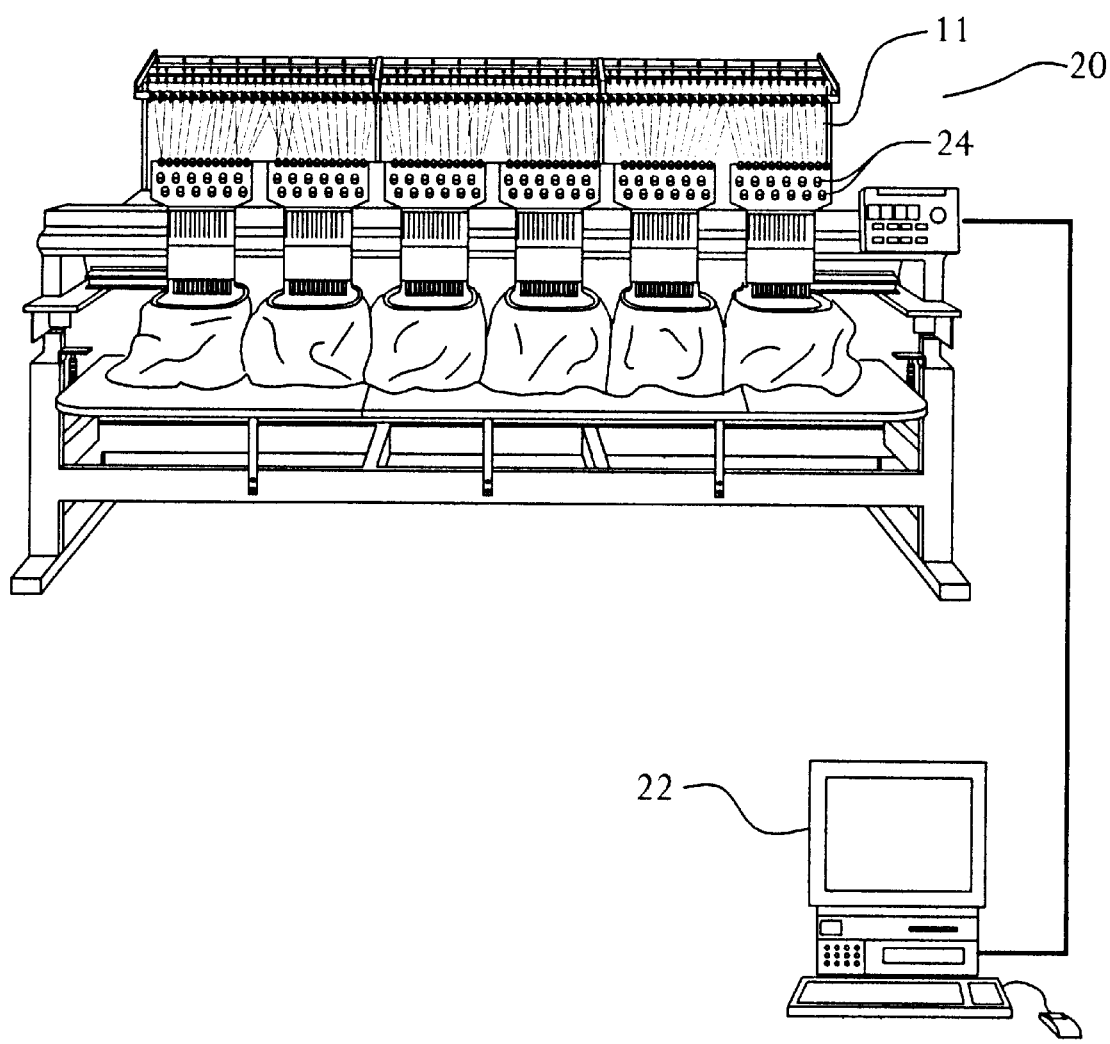
FIG. 3 is an front perspective view of a preferred programmable sewing machine and computer for manufacturing element precursors.

With reference to FIG. 3, the preferred programmable sewing machine 20 will now be described. The preferred programmable sewing machine is one of a number of powerful embroidery design systems that use advanced technology to guide an element designer through design creation, set-up and manufacturing. The preferred programmable sewing machine 20 is linked with a computer 22, such as a personal computer or server, adapted to activate the sewing operations. The computer 22 preferably contains or has access to, embroidery or CAD software for creating thread paths, borders, stitch effects, etc.

The programmable sewing machine 20 includes a series of bobbins for loading thread and resistance heating wire or fine resistance heating ribbon. Desirably, the bobbins are prewound to control tension since tension, without excessive slack, in both the top and bottom bobbins is very important to the successful capturing of resistance heating wire on a substrate. The thread used should be of a size recommended for the preferred programmable sewing machine. It must have consistent thickness since thread breakage is a common mode of failure in using programmable sewing machines. An industrial quality nylon, polyester or rayon thread is highly desirable. Also, a high heat resistant thread may be used, such as a Kevlar thread or Nomex thread known to be stable up to 500° F. and available from Saunders Thread Co. of Gastonia, N.C.

The programmable sewing machine of this invention preferably has up to 6–20 heads and can measure 6 foot in width by 19 feet long. The sewing range of each head is about 10.6 inches by 26 inches, and with every other head shut off, the sewing range is about 21 inches by 26 inches. A desirable programmable sewing machine is the Tajima Model No. TMLG116-627W (LT Version) from Tajima, Inc., Japan.

The preferred method of capturing a resistance heating wire 12 onto a supporting substrate 11 in this invention will now be described. First, an operator selects a proper resistive element material, for example, Ni—Cr wire, in its proper form. Next, a proper supporting substrate 11, such as 8440 glass mat, is provided in a form suitable for sewing. The design for the element is preprogrammed into the computer 22 prior to initiating operation of the programmable sewing machine 20. As with any ordinary sewing machine, the programmable sewing machine 20 of this invention contains at least two threads, one thread is directed through the top surface of the supporting substrate, and the other is directed from below. The two threads are intertwined or knotted, ideally somewhere in the thickness of the supporting substrate 11, so that one cannot view the knot when looking at the stitch and the resulting element precursor 10. As the top needle penetrates the substrate 11 and picks up a loop of thread mechanically with the aid of the mechanical device underneath, it then pulls it upward toward the center of the substrate 11 and if the substrate is consistent and the thread tension is consistent, the knots will be relatively hidden. In a preferred embodiment of this invention, the resistance heating wire 12 is provided from a bobbin in tension. The preferred programmable sewing machine 20 of this invention provides a third thread bobbin for the electrical resistance wire 12 so that the programmable sewing machine 20 can lay the resistance wire 12 down just in front of the top needle. The preferred operation of this invention provides a zig zag or cross stitch, as shown in FIG. 1A, whereby the top needle criss-crosses back and forth as the supporting substrate 11 is moved, similar to the way an ornamental rope is joined to a fabric in an embroidery operation. A simple looping stitch with a thread 14 is also shown. Sewing by guiding the top needle over either side of the resistance heating wire 12 captures it in a very effective manner and the process is all computer controlled so that the pattern can be electronically downloaded into the computer 22 and automatically sewn onto the substrate of choice. The thickness of the substrate is therefore only limited by the top dead-center stroke of the top needle, so fairly thick substrates in the range of up to 0.5 inches, or substrates that have a wavy surface or a texture could be used.

The programmable sewing machine 20 of this invention can sew an electrical resistance wire 12, 5 mil–0.25 inch in diameter or thickness, onto a supporting substrate 11 at a rate of about 10–500 stitches per minute, saving valuable time and associated cost in making element precursors. One application envisioned is to create a heated toilet seat. Such a seat could contain an element having about 5,800 stitches.

Using the techniques of this invention an element precursor for a heated toilet seat can be fabricated in about 15–20 minutes per head, allowing for the fabrication of 8–16 element precursors for this application in about 15 minutes.

Construction Techniques

Figure 4:
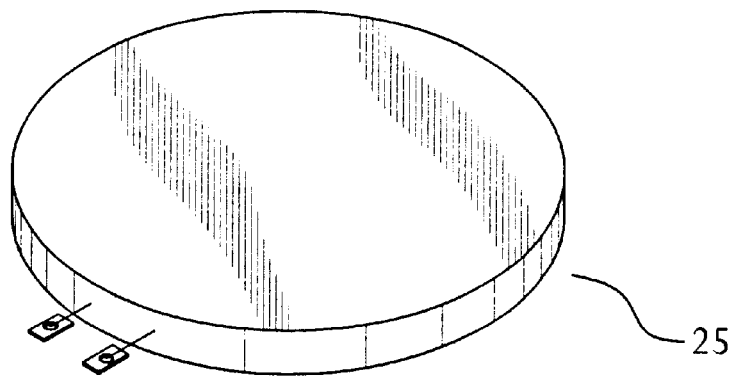
FIG. 4 is a top perspective view of a preferred planar surface heating element embodiment.

As shown in FIGS. 4 and 5, the heating element 25 of this invention can be fabricated in sections including a top polymeric layer 26, bottom polymeric layer 28 and element precursor 10. Preferred molding techniques include compression molding, injection molding, blow molding, extrusion or rotational molding, for example. Additionally, the element precursor can be fused or electrofused to the top and bottom polymeric layers 26 and 28 by vacuuming forming or using the electrical energy provided by the circuit path 18 when electrically energized through the electrical conductors 15 and 16. When used with the fusible layers described above, it is relatively important that the supporting substrate 11 permit flowing polymer to pass through the substrate to create a single integrated heated product. When non-woven or woven fibrous mats are used, an air permeability rating of at least about 1,000 cubic feet per minute is a desirable degree of porosity. It will be envisioned that operators will need to adjust the porosity of the supporting substrate 11 in order to permit a molten polymer with a known viscosity to pass through the pores of the substrate. For example, a fabricated heating element 25 possessing a highly porous substrate, such as an open mesh glass fiber fabric, will be more conducive to a high processing viscosity polymeric material, whereas a more tight knit fabric or thermoplastic film, for example, will result in a low porosity substrate, requiring a low processing viscosity material, or alternatively, a melt or fused bond.

The ability to mechanically attach resistive elements, such as wires, films and ribbons, to substrates opens up a multitude of design possibilities in both shape and material selection. The present invention permits designers to mix and match substrate materials by selecting their porosity, thickness, density and contoured shape with selected resistance heating materials ranging in cross-section from very small diameters of about 5 mil to rectangular and irregular shapes, to thin films. Alternatively, circuits, including microprocessors, fiberoptic fibers or optoelectronic devices, (LEDs, lasers) microwave devices (power amplifiers, radar) and antenna, high temperature sensors, power supply devices (power transmission, motor controls) and memory chips could be added for controlling temperature, visual inspection of environments, communications, and recording temperature cycles, for example. The overall thickness of the element precursor is merely limited by the vertical maximum position of the needle end, less the wire feed, which is presently about 0.5 inches, but may be designed in the future to be as great as 1 inch or more. Resistive element width is not nearly so limited, since the transverse motion of the needle can range up to a foot or more.

Alternatively, a spun resistance heating wire could be sewn onto a polymer impregnated sheet, such as G10 or FR4 printed circuit board substrate available in various prepreg forms. The resulting sheet can then be vacuum formed. A further embodiment can be created by embroidering a resistance wire to a thick ceramic grid substrate. An additional wire could also be attached to the substrate prior to overmolding the element precursor with a high temperature, non-conductive material, such as glass. While not containing a thermoplastic material, this high temperature design could have practical applications in harsh environments. A further embodiment could include wrapping a resistance heating wire with an insulating material, such as fiberglass yarn, prior to joining the wire to a metallic film, such as aluminum foil. This element precursor could then be placed between sheets of polymer and molded or vacuum formed into a net shape. In still a further embodiment of this invention, a wire could be sewn to a prepreg of printed circuit laminate material which is thereafter compression molded into a very thin flat shape suitable for use in a typical injection molding operation. Such a method would construct a mechanically rigid element assembly that could withstand the high velocity material flow indicative of injection molding.

A resistance wire or ribbon material may also be joined to a softer material, such as clay. The resulting element precursor can be contoured into a multi-dimensional shape, such as a tube or cup with or without overlaying similar materials, such as further layers of clay. The precursor with the overlay can be formed or molded, and then fired to cure and create a final net shape, such as self-heating pottery or food service equipment. Other designs can create multi-dimensional contoured net shapes from a flat precursor made of thermoplastic or thermosetting materials which are later formed prior to final setting. Flat sheets of heated materials could also be created for HVAC, or medical applications, such as sterilizing trays or the like.

The use of known embroidery machinery in the fabrication of element precursors allows for a wide variety of raw materials and substrates to be combined with various resistance heating materials. The above construction techniques and sewing operation also provide the ability to manufacture multi-layered substrates, including embedded metallic and thermally conductive layers with resistance wires wrapped in an electrically insulating coating, so as to avoid shorting of electric current. This permits the application of a resistance heating wire to both sides of the thermally conductive metallic layer, such as aluminum foil, for more homogeneously distributing resistance heat.

Injection Mold Dry Capture Embodiment

Figure 6:
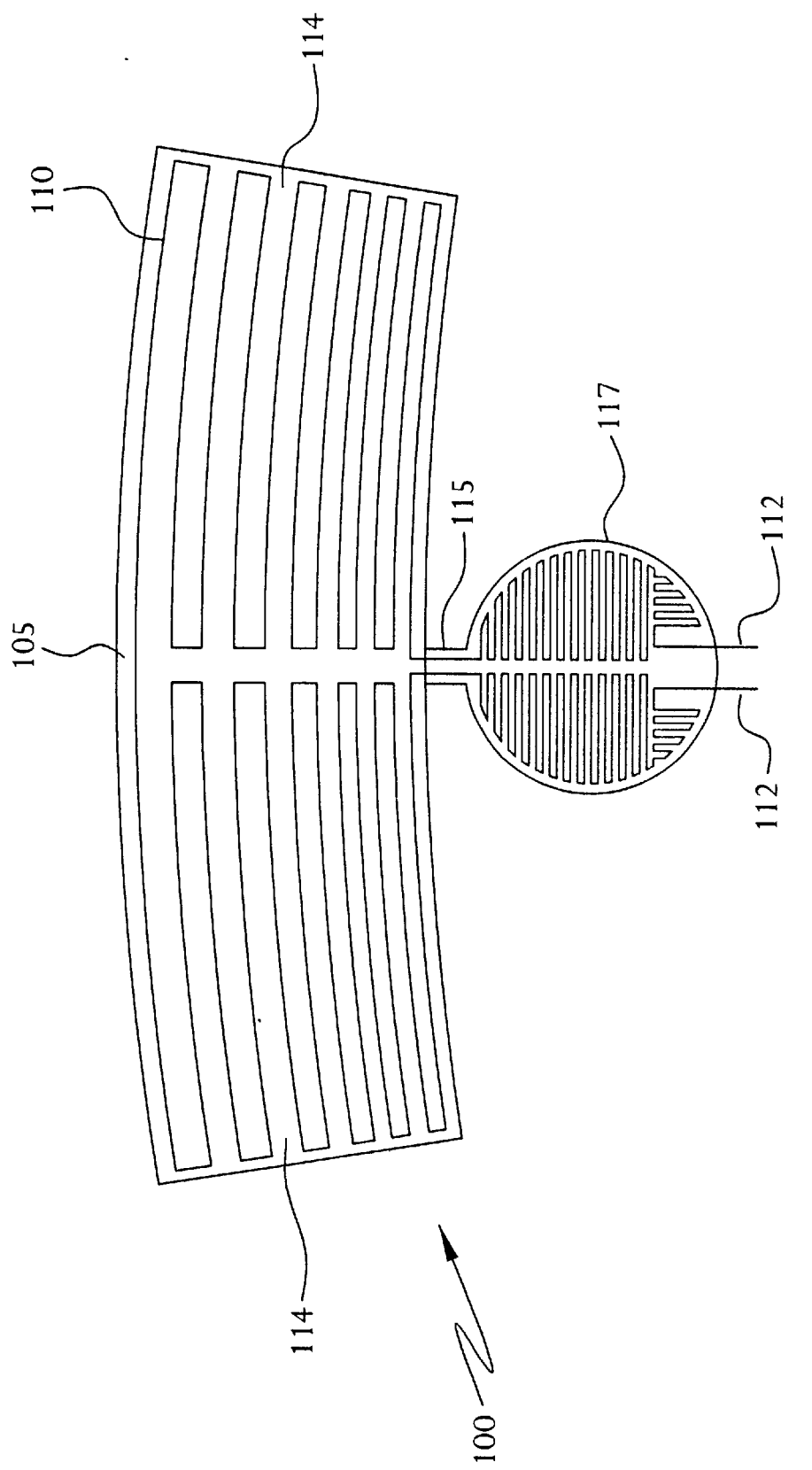
FIG. 6 is a front plan view of a preferred element precursor for inclusion in an exemplary heated cup assembly according to the present invention.

The present invention provides a heated element assembly that effectively and efficiently integrates the above-described element precursors into more complex geometrical shapes while overcoming the aforementioned problems associated with the accurate placement of element precursors during injection molding. FIG. 6 is a top plan view of an exemplary resistance heating element 100. The resistance heating element 100 is preferably constructed in a manner described above for element precursor 10 shown in FIGS. 1, 1A, and 2 and includes supporting substrate 105 and a electrical resistance heating material, such as resistance wire 110, sewn or glued thereon. The supporting substrate, however, need not have a porosity as described above sufficient to permit flowing polymer to pass through the substrate in the dry capture embodiment of the present invention described hereafter. The resistance wire 110 forms a predetermined circuit path having a pair of terminal end portions 112, which are preferably riveted, grommeted, brazed, clinched, compression fitted or welded to a pair of electrical connectors (not shown). The resistance heating element 100 is preferably shaped to substantially conform to the shape of a desired heating element assembly.

Figure 6A:
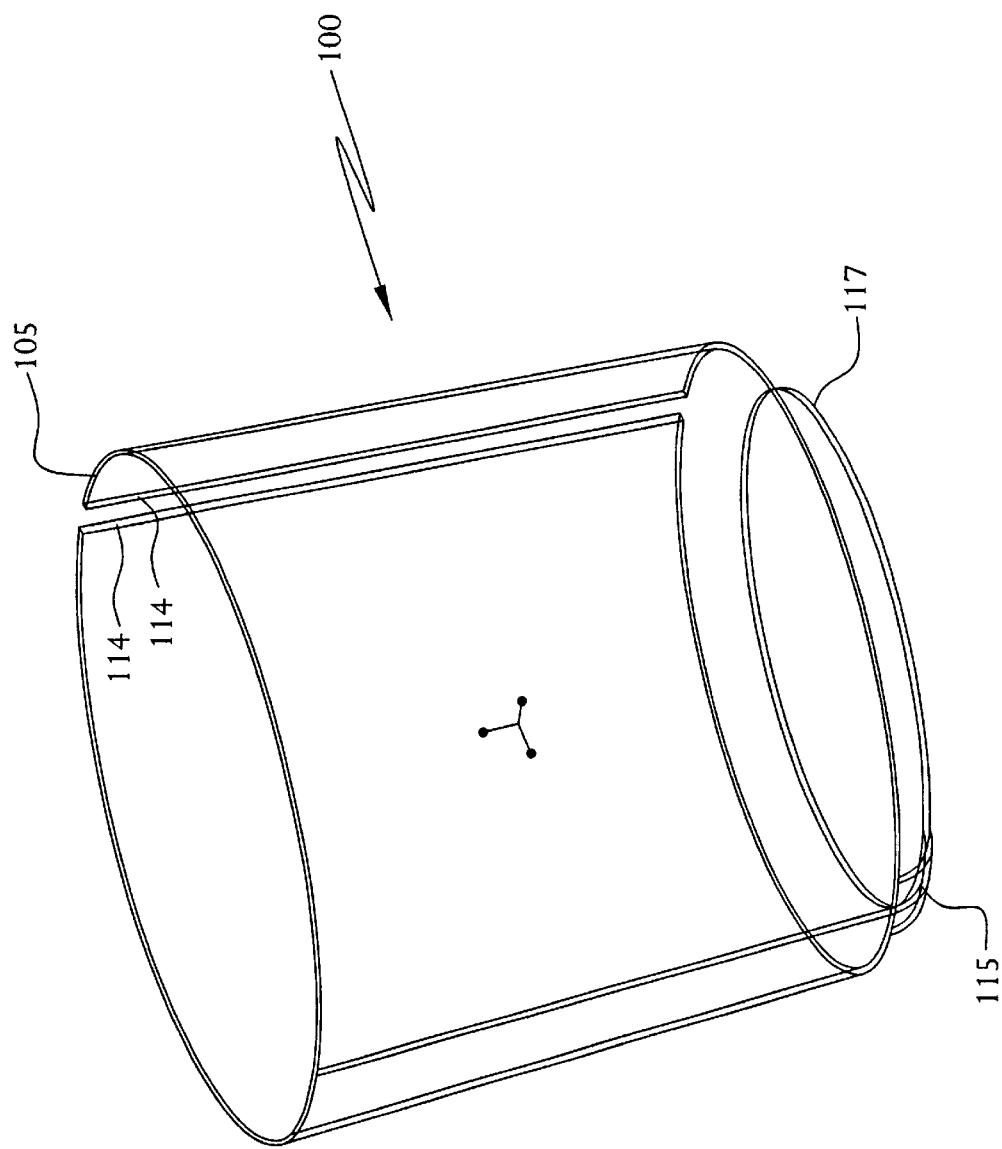
FIG. 6A is a perspective view of the supporting substrate of the element precursor shown in FIG. 6 folded to conform to a cup shape.

FIG. 6A is a perspective view of the resistance heating element 100 shown without the resistance wire 110. FIG. 6A illustrates that the supporting substrate 105 is shaped such that it may be folded into a predetermined geometrical shape. The body portion 114 of supporting substrate 105 is folded at junction 115 away from base portion 117. The body portion 114 is then wrapped to form the cup shape shown in FIG. 6A.

Figure 7A:
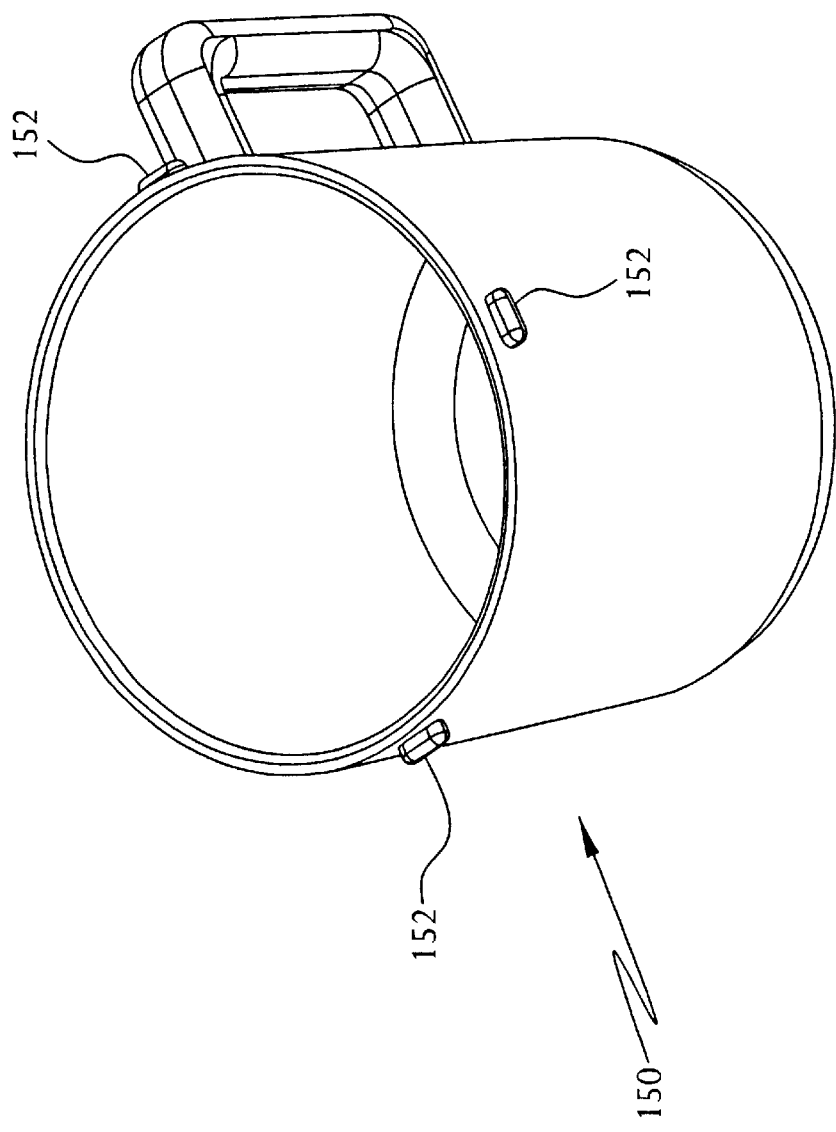
FIG. 7A is a perspective view of first molded section of a cup according to the present invention.
Figure 7B:
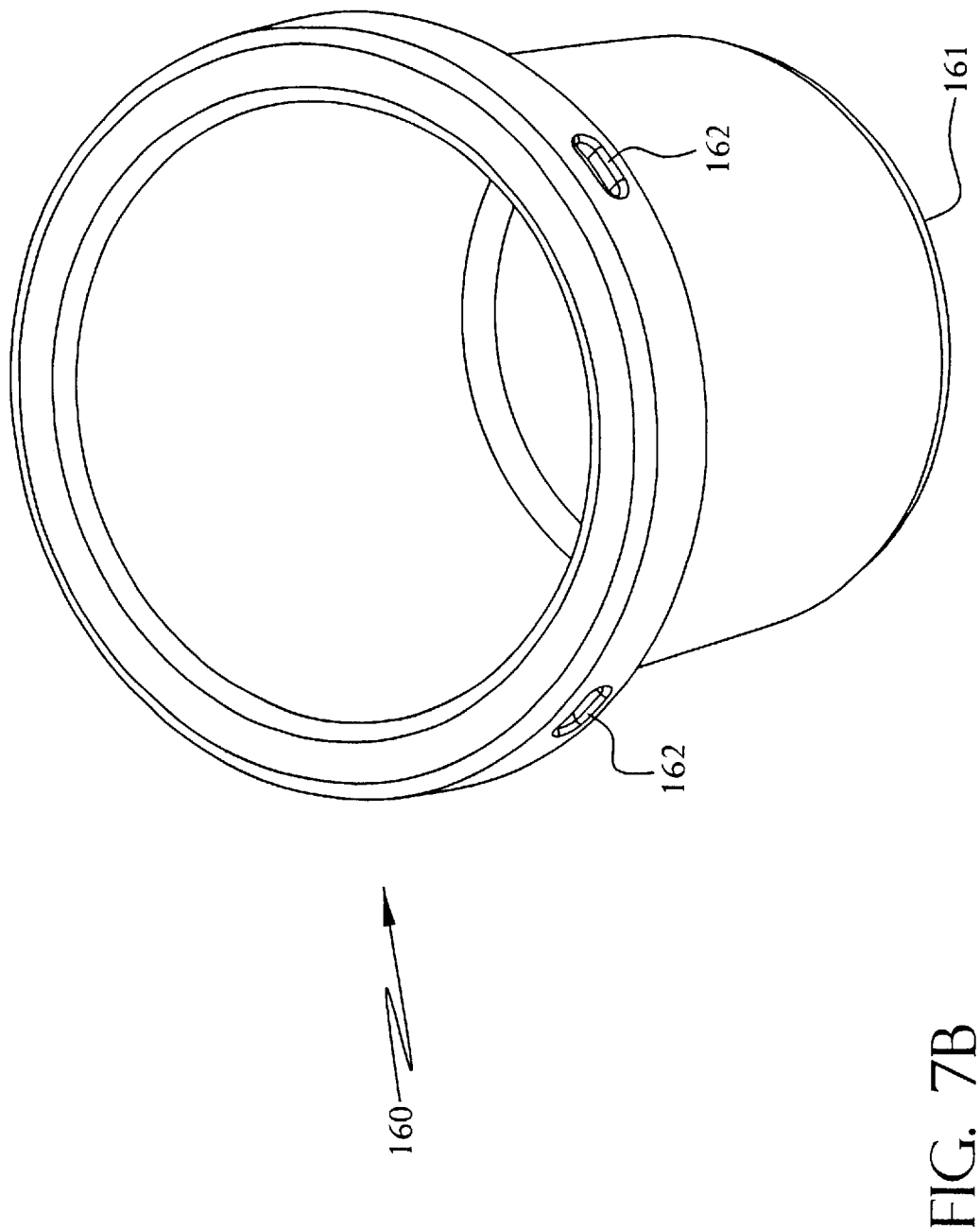
FIG. 7B is a perspective view of a second molded section of a cup for mating with the first molded section described in FIG. 7A.

FIG. 7A is a perspective view of an exemplary first molded section 150 of a heated cup assembly according to the present invention. FIG. 7B is a perspective view of a second molded section 160 of a heated cup assembly. The molded sections 150, 160 are shaped to mate with each other to form a cup. The base 161 of molded section 160 is positioned within the molded section 150, and the sections 150, 160 may be snap-fitted together at snaps 152 and corresponding snap recesses 162.

Figure 7C:
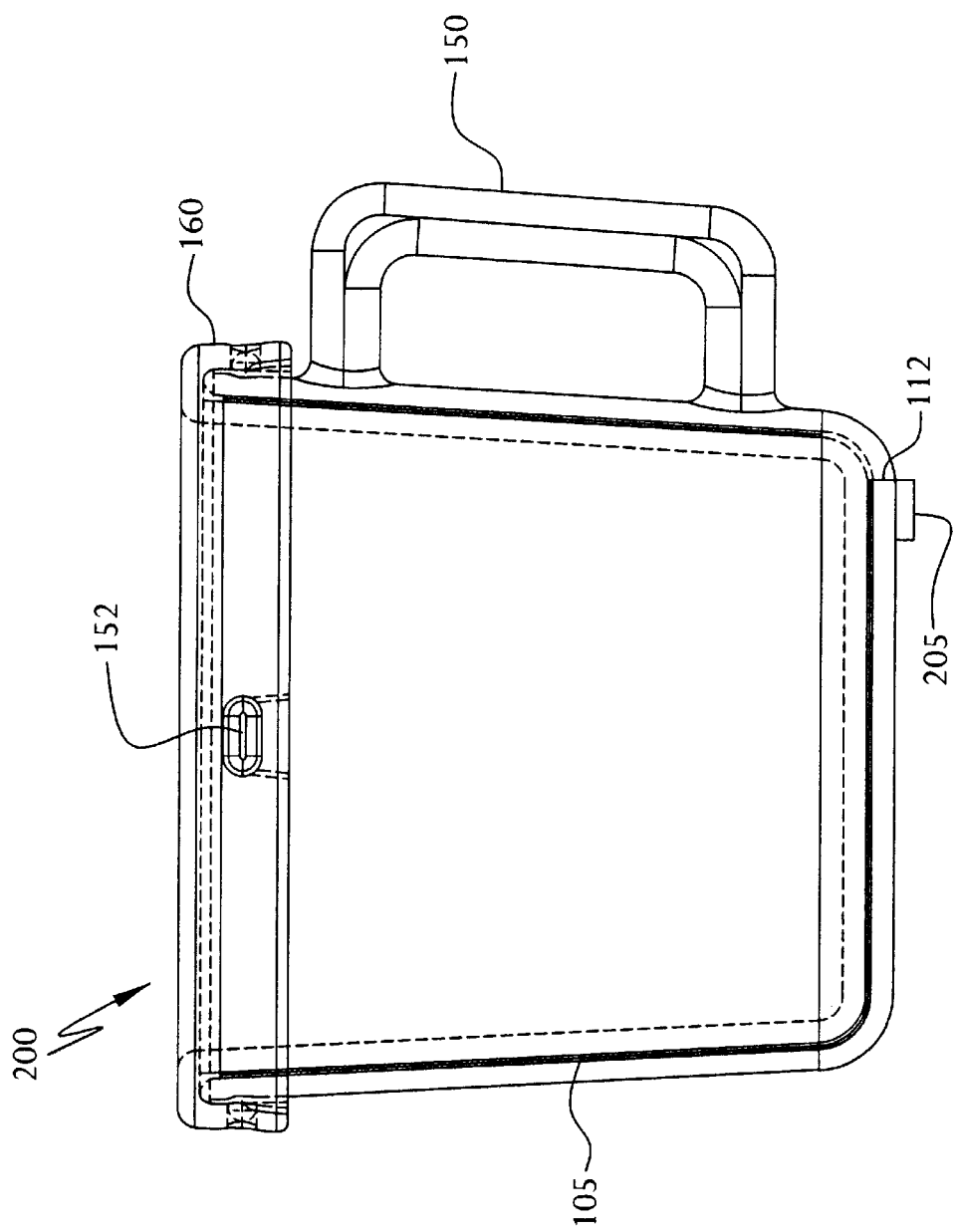
FIG. 7C is a side elevational view of an exemplary heated cup assembly shown in phantom according to the present invention.
Figure 7D:
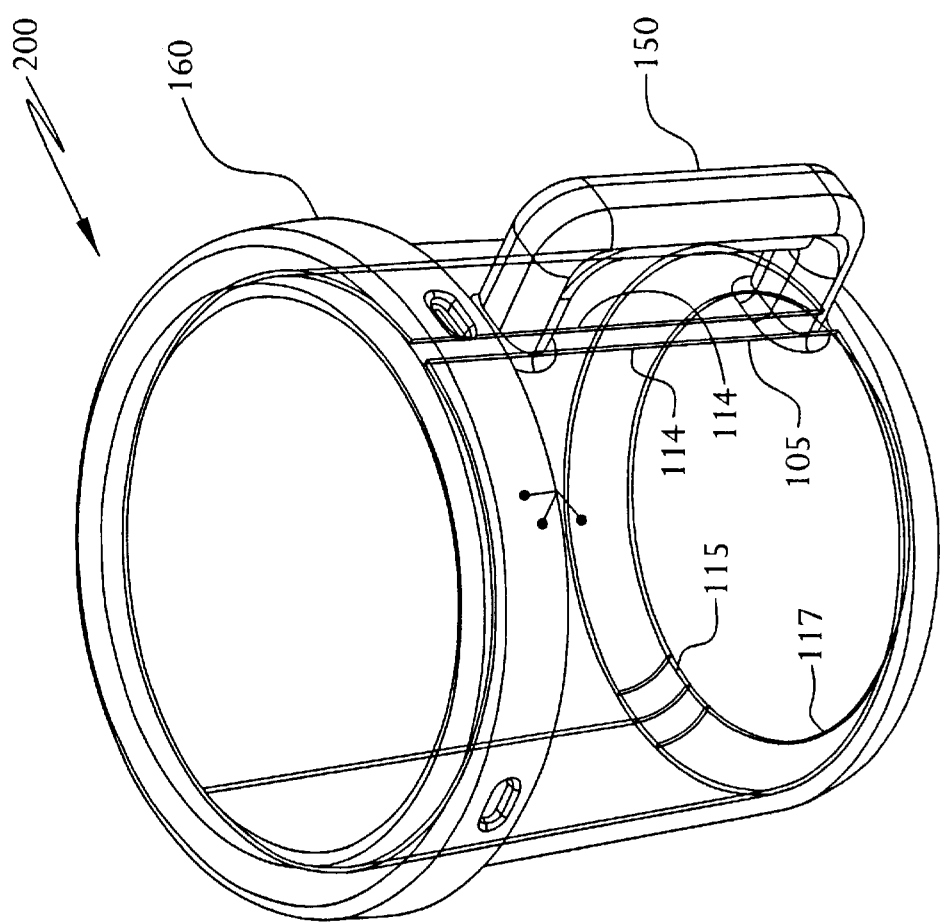
FIG. 7D is a perspective view of an exemplary heated cup assembly shown in phantom according to the present invention.

A heated cup assembly 200 includes the molded sections 150, 160 and resistance heating element 100, as shown in FIGS. 7C and 7D. FIG. 7C is a side elevational view of a heated cup assembly 200 shown in phantom. For illustrative purposes, the assembly 200 is shown to include the supporting substrate 105 of resistance heating element 100 without the attached resistance wire 110, although the terminal end portions 112 are shown. The resistance heating element 100 is preferably positioned within molded section 150 and folded as shown in FIG. 6A to conform to the cup shape of molded section 150. The terminal end portions 112 are preferably positioned to extend through openings formed in the molded section 150 so that the terminal end portion 112 may be connected to external electrical connections 205, as shown in FIG. 7C. The molded section 160 is positioned over heating element 100 and within molded section 150. The two molded sections 150, 160 are secured together by a snap fit connection. In this manner, the molded sections substantially encompass the circuit path formed on supporting substrate 105, and the heating element 100 is secured between the molded sections by an interference fit. The interference fit may be created by contact with the interior surfaces of molded sections or by capturing a portion of the supporting substrate within the snap-fit, or other connection, between the molded sections.

FIG. 7D is a perspective view of a completed heated element cup 200 also shown in phantom. Again, for illustrative purposes, the resistance wire 110 of electrical resistance heating element 100 is not shown. The supporting substrate 105 is captured between the molded sections 150, 160 and conforms to the shape of the two molded sections.

Figure 8A:
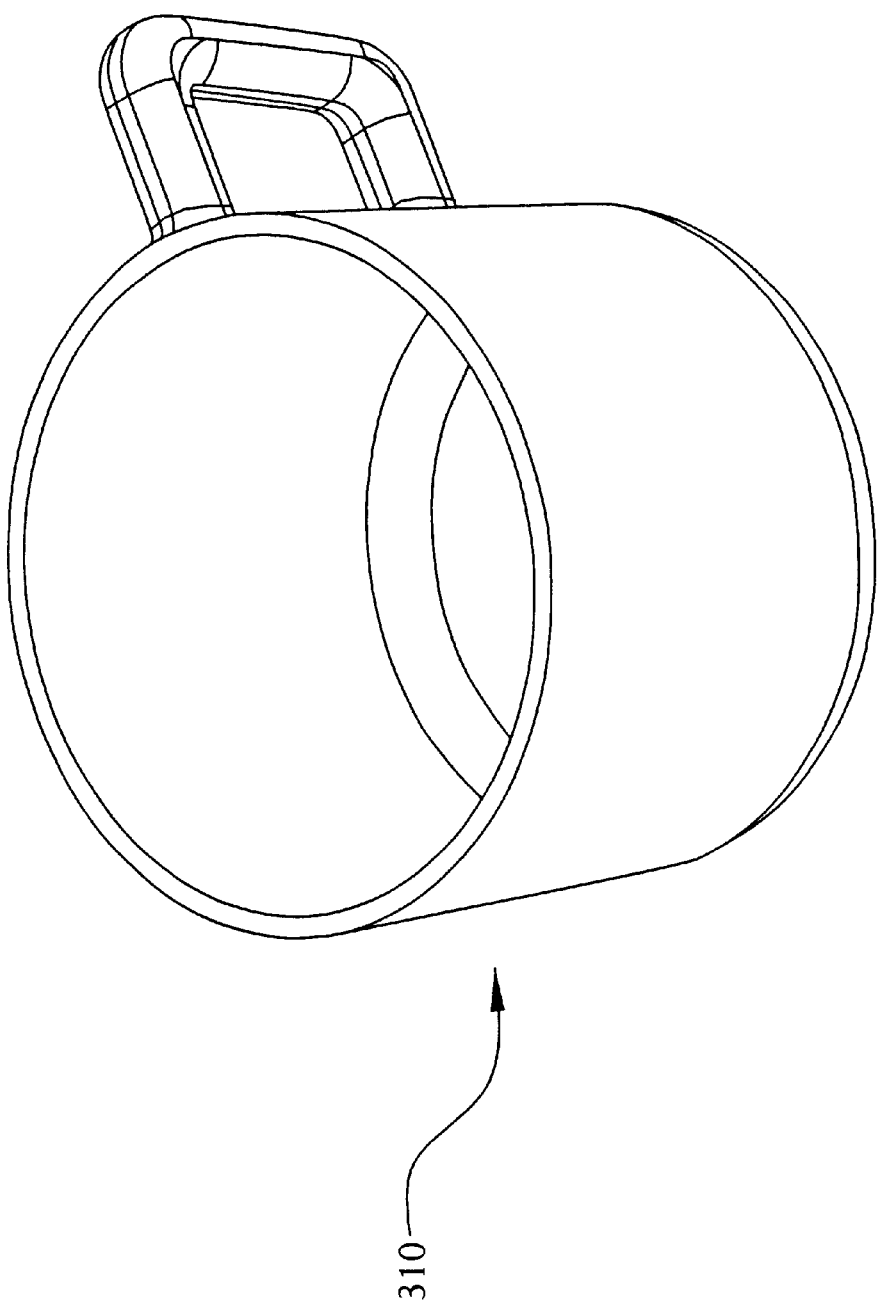
FIG. 8A is a perspective view of another exemplary first molded section of a cup according to the present invention.
Figure 8B:
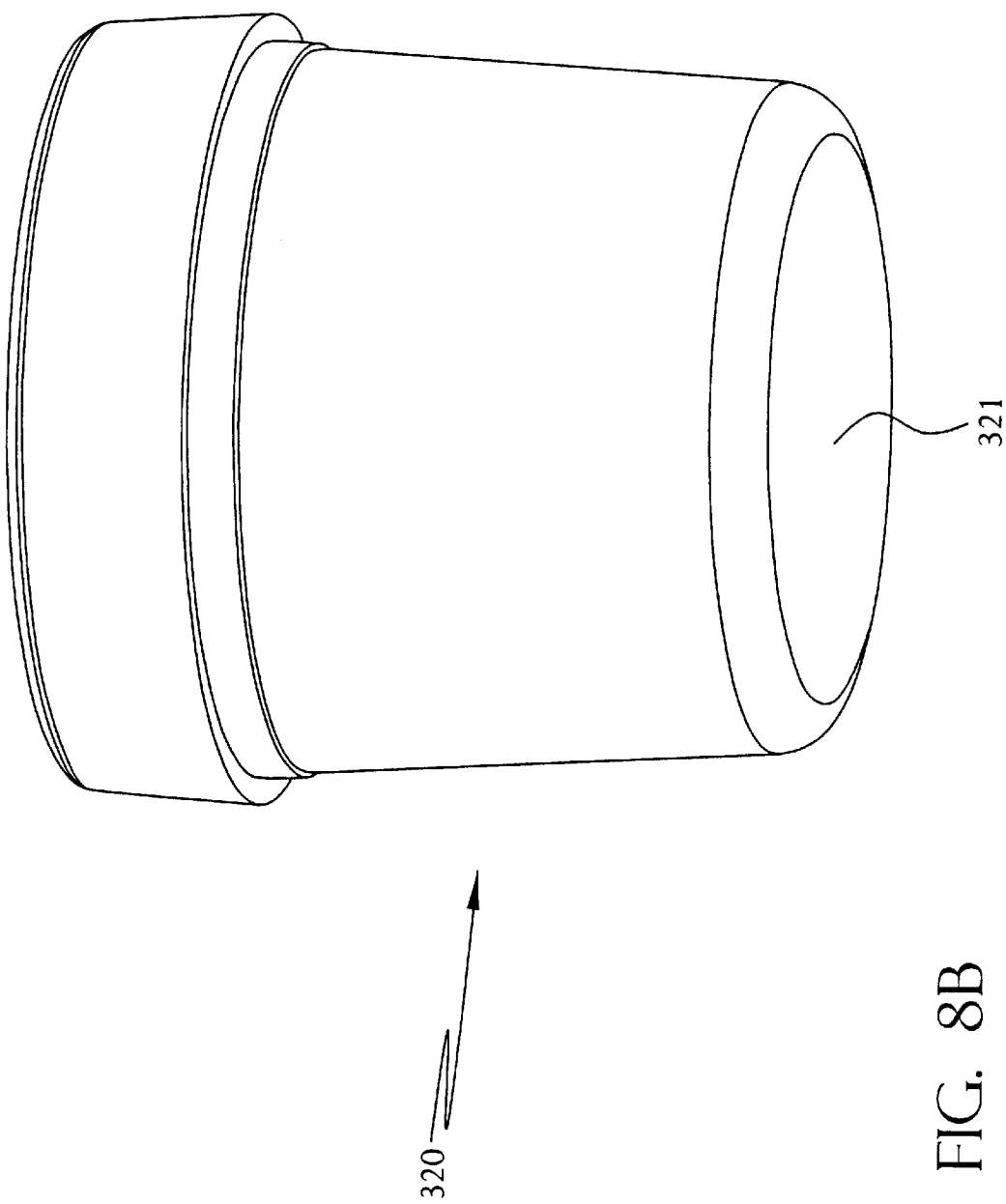
FIG. 8B is a perspective view of another exemplary second molded section of a cup for mating with the first molded section described in FIG. 8A.
Figure 8C:
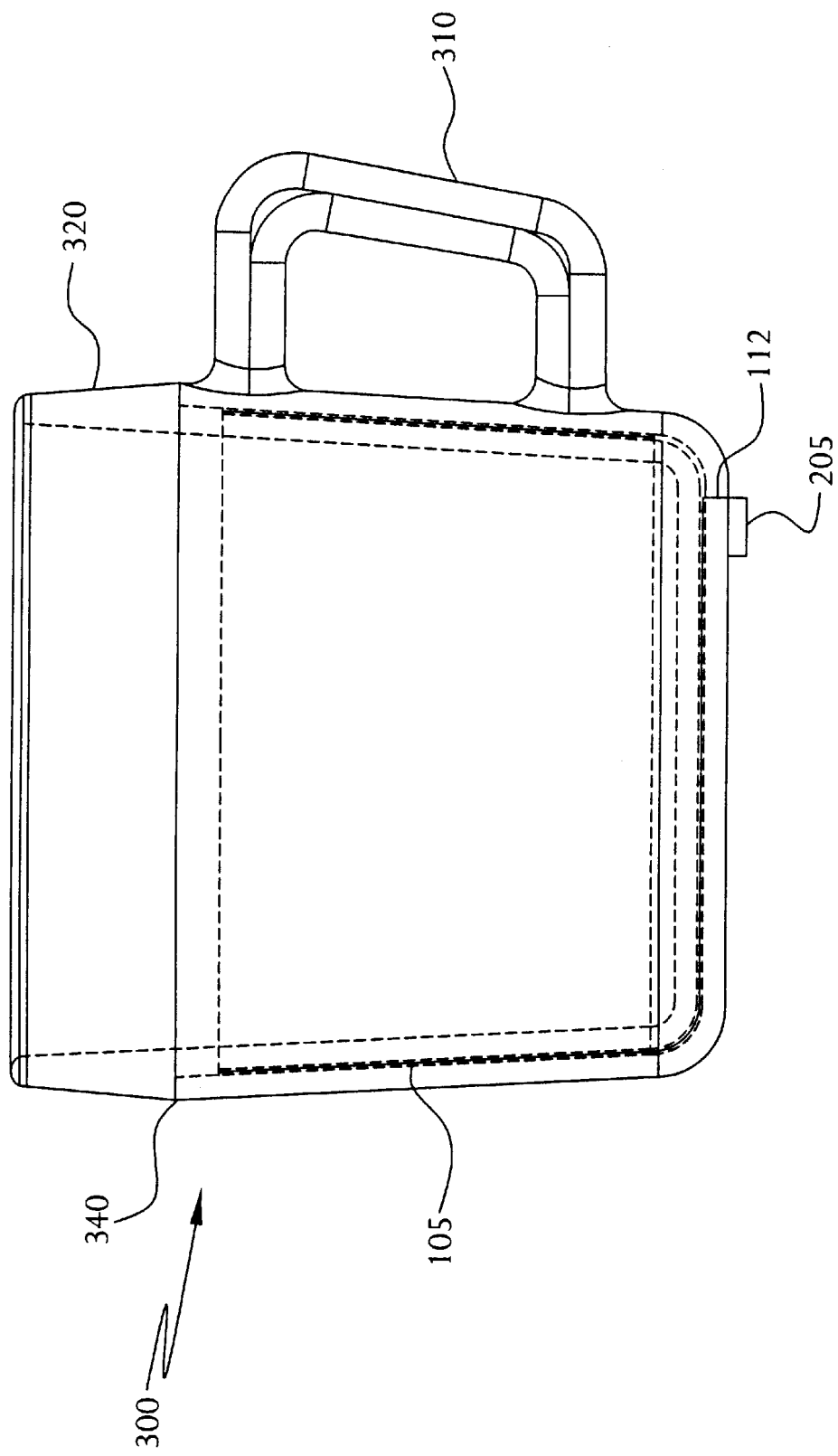
FIG. 8C is a side elevational view of another exemplary heated cup assembly according to the present invention.

FIGS. 8A, 8B, and 8C show another exemplary embodiment of a heated cup assembly 300 according to the present invention. First molded section 310 and second molded section 320 are shaped to mate with each other. As described above, heating element 100 may be folded and placed within molded section 310 to conform to the cup shape of molded section 310. The base 321 of molded section 320 is fitted over heating element 100 and within molded section 310, as shown in FIG. 8C. FIG. 8C shows a seam 340 formed between mated molded sections 310 and 320. The molded sections 310, 320 are preferably welded together at seam 340. It should be understood that many welding techniques are appropriate for securing the molded sections together, including, but not limited to, spin welding, melt bonding, sonic welding, vibration welding, hot air welding, or a combination thereof. A portion of the supporting substrate may be positioned within the seam 340 to further secure the supporting substrate and the resistance heating element in a selected position. Alternatively, the molded sections may be secured to each other by electro-fusing the sections together.

Mated sections 310, 320 are shown in phantom in FIG. 8C. The molded sections 310, 320 are secured so to substantially encompass the supporting substrate 105 and secure the supporting substrate 105 and resistance wire (not shown) in a selected position by an interference fit.

In heated cup embodiments 200, 300, the resistance heating element is preferably oriented such that the surface of the supporting substrate 105 to which the resistance wire 110 is fastened faces molded section 320 or molded section 160, as the case may be. In this manner, the supporting substrate 105 acts as a thermal barrier between resistance wire 110 and molded sections 150, 310. The supporting substrate 105 helps to insulate the gripping surface of heated cup 200, 300 from the heat generated by the resistance wire 110. The resistance wire 110 is oriented toward molded section 160 or molded section 320 in order to efficiently direct generated heat towards any contents, such as a liquid, held by the heated cup 200, 300.

Figure 10A:
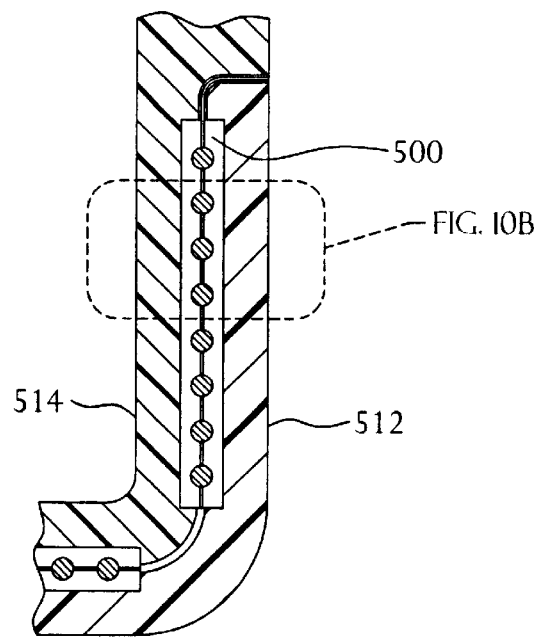
FIG. 10A is a cross sectional view of a heated element assembly shown in partial including a resistance heating element with a first and second supporting substrate.
Figure 10B:
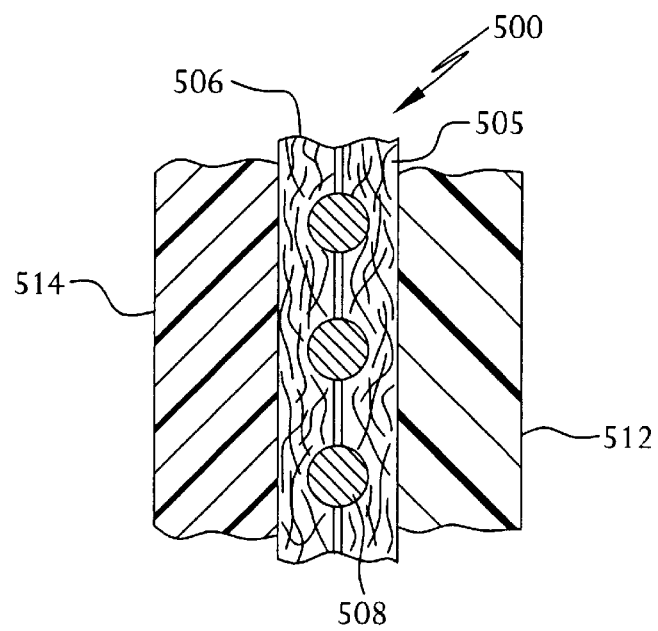
FIG. 10B is an enlarged view of a portion of the heated element assembly described in FIG. 10A.

Referring to FIGS. 10A and 10B, a resistance heating element 500 may include first and second supporting substrates 505, 506 fastened to resistance heating wire 508. The resistance wire 508 is fastened between the supporting substrates 505, 506, and the supporting substrates 505, 506 serve as thermal buffers between the resistance wire 508 and the first and second molded sections 512, 514 and/or protect the integrity of the molded sections. Because the resistance wire 508 does not contact the molded sections 512, 514, higher wire watt densities may be used for the resistance wire 508. The electrical resistance heating element 500 occupies an area defined between the molded sections 512, 514 that is preferably about 40 to 50 thousandths of an inch, but it should be apparent that the size of this area will vary with each design and product. The supporting substrates 505, 506 are preferably of a loose weave construction, thereby providing micro air gaps in the area between the molded sections 512, 514. It has been proven that micro air gaps offer enhanced thermal uniformity by facilitating heat distribution by air or gas flow through convection.

The present invention also provides the ability to selectively bias generated heat toward a desired molded section. The thicknesses of the first and second supporting substrates 505, 506 may be selected to bias heat generated by resistance wire 508 toward either molded section 512 or molded section 514. For example, first supporting substrate 505 may be selected to be twice as thick as second supporting substrate 506, thereby further insulating molded section 512 from resistance wire 508 and directing heat toward molded section 514. Alternatively, the supporting substrates may be selected to have different thermal characteristics, such as by varying the porosities of the substrates.

The present invention further provides the ability to selectively control heat distribution through the design of the molded sections. The molded sections may have different thicknesses, be constructed of different materials having different k-values and/or include different conductive additives, such that one molded section is a better thermal conductor than the other molded section. Molded section design may also be supplemented with supporting substrate design to bias heat in a desired manner. This ability allows for a design to control heat transfer and bias generated thermal energy for an application's specific purpose, such as cooking, biological processing, or printing applications. In cooking applications, for example, the outer molded sections would preferably be a poor thermal conductor and the inner molded section would preferably be a good thermal conductor. The ability to bias heat in a desired manner also allows for unlimited custom designs.

The ability to control heat distribution through design also provides improved heat efficiency for heating element assemblies. By selectively biasing heat in a desired direction, e.g., toward a first molded section contacting contents of a heated container assembly, and away from a second molded section, less heat is unwontedly dissipated to the surroundings and the efficiency of a heated element assembly is increased. For example, less energy is required to maintain the contents of a heated pan or cup at a selected temperature over a period of time because the heat is selectively biased toward the contents, and not allowed to escape to the surroundings through the outer molded section.

If a snap-fit connection is used to secure a first molded section to a second molded section, or other fasteners such as screws or the like, it is possible to replace defective or non-functioning heating elements, regulatory components or circuits elements. The molded sections may simply be separated from each other and the defective, heating element, circuit ir component may be removed. Then, a replacement element, circuit, or component may be positioned in the same manner the original element, component or circuit was positioned. The molded sections may then be secured to each other.

Figure 13A:
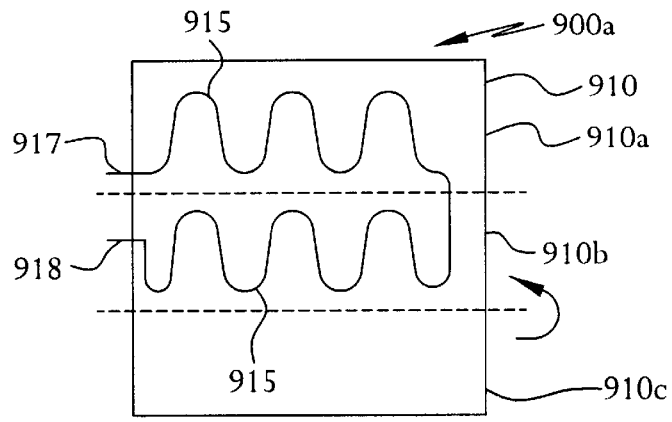
FIGS. 13A, 13B, 13C are front plan views of an exemplary embodiment of a dense circuit path resistance heating element according to the present invention.
Figure 13B:
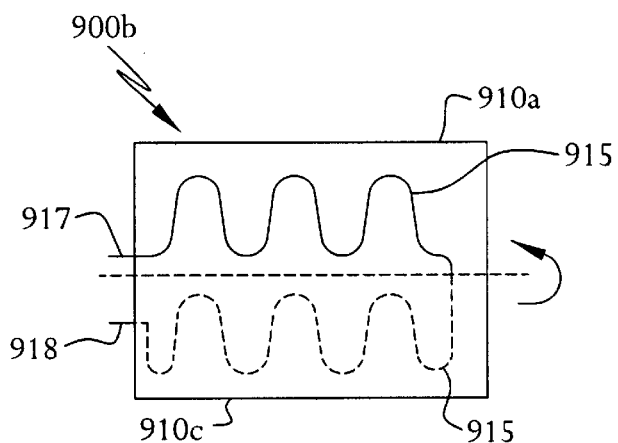
Figure 13C:
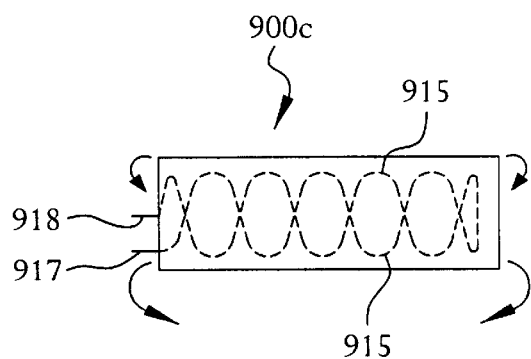

In one embodiment of the present invention, the supporting substrate may be folded to provide a more uniform heating plane. For example, assume that a resistance heating material, such as a resistance wire, is sewn to a supporting substrate in a predetermined circuit path. A sewing machine may only be capable of sowing a resistance wire to within sixty thousandths of an inch of itself as the resistance wire loops through its circuit path. The resistance heating wire may, however, only be ten thousandths of an inch in diameter. If its desired to have a denser heat plane, the circuit path may be designed so that the a denser circuit path is formed when the supporting substrate is folded. Referring to FIGS. 13A, 13B, and 13C, supporting substrate 910 of heating element 900 includes three sections, 910a, 910b, and 910c. Circuit path 915 includes terminal end portions 917, 918 and may be sewn on supporting substrate 910. Section 910c may be folded over section 910b to form heating element 900b, as shown in FIG. 13B. Section 910c and 910b may then be folded onto section 910a to form heating element 900c of FIG. 13C. Heating element 900c may then be folded to, for example, form a cup-shaped heating element that substantially conforms to the shape of the molded sections of a heated cup assembly.

In this manner, section 900c insulates circuit path 915 from itself and prevents the resistance wire of circuit path 915 from shorting itself by crossing itself. Alternatively, section 910c may be eliminated from the design, and the supporting substrate 910 may be folded such that the circuit path 915 is folded away from itself and insulated from itself by the supporting substrates of sections 910a and 910b. It should be apparent from FIG. 13C that the heating element 900c provides a denser heat plane that the heating element 900a. More intricate patterns are also within the scope of the present invention. Further, the supporting substrate 910 may be folded any number of times, as long as the resulting thickness of the heating element is accounted for in the design of a heated element assembly. This embodiment of the present invention also provides further flexibility in biasing generated heat through combinations of folding orientation and supporting substrate design.

Figure 11A:
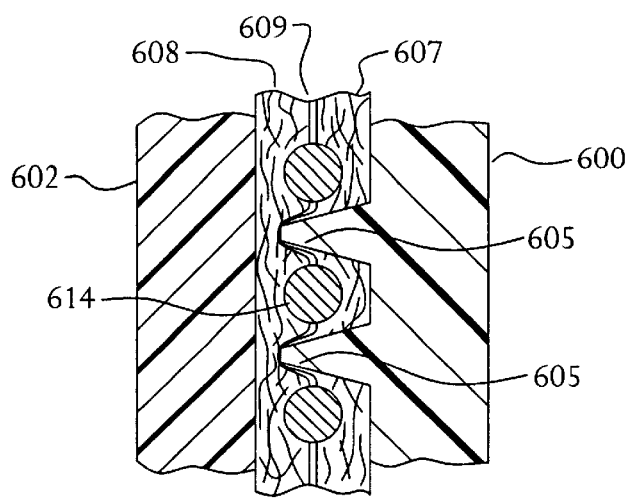
FIG. 11A is a cross sectional view of a heated element assembly including a resistance heating element with a first and second supporting substrate and a molded section with protrusions extending therefrom.
Figure 11B:
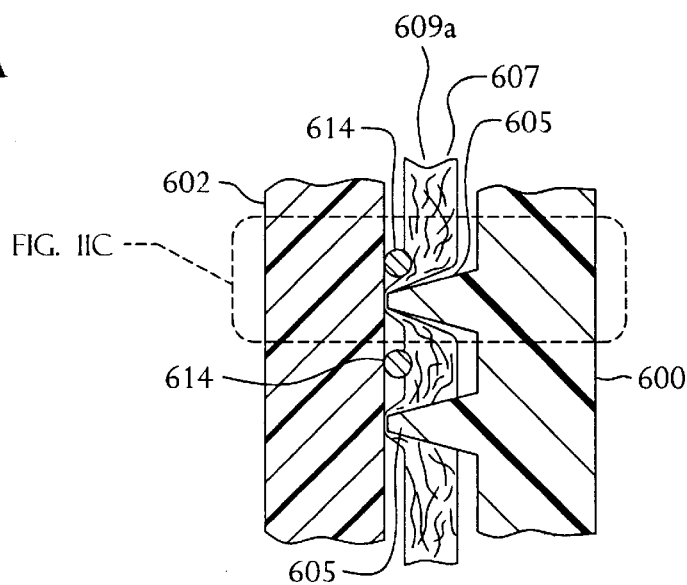
FIG. 11B is a cross sectional view of a heated element assembly including a resistance heating element with a single supporting substrate and a molded section with protrusions extending therefrom.
Figure 11C:
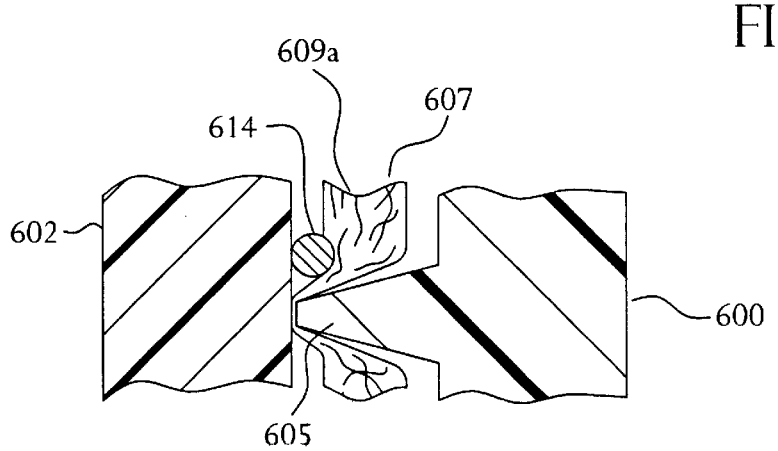
FIG. 11C is an enlarged view of a portion of the heated element assembly described in FIG. 11B.

FIGS. 11A, 11B, and 11C show a first molded section 600 of a heated element assembly that includes protrusions 605 extending from molded section 600 toward first supporting substrate 607. The resistance heating element 609 of FIG. 11A includes first supporting substrate 607 and second supporting substrate 608. Protrusions 605 extend from first molded section 600 and help to secure resistance heating element 609 in a fixed position by compressing supporting substrate 607 and supporting substrate 608 toward second molded section 602. The protrusions 605 also help, then, to further locally secure resistance wire 614 in its selected position. This is particularly useful if a stitch securing a resistance material to the substrate breaks or degrades.

FIGS. 11B and 11C show a resistance heating element 609a including a first supporting substrate 607. Protrusion 605 of first molded section 600 compresses supporting substrate 607 and resistance wire 614 toward second molded section 602. This compression helps to further locally secure resistance wire 614 in a desired position within a heating element assembly. Further, it may be desirable in certain instances to allow resistance heating material 614 to contact second molded section 602. The amount of heat generated by resistance wire 614 and the polymer used for second molded section 602 may be selected to allow resistance wire 614 to form into second molded section 602 as second molded section 602 yields to heat generated by resistance wire 614. This provides further support for maintaining the resistance wire 614 in its selected position. It should also be understood that both the first and second molded sections could include protrusions disposed in a preselected pattern.

Figure 11D:
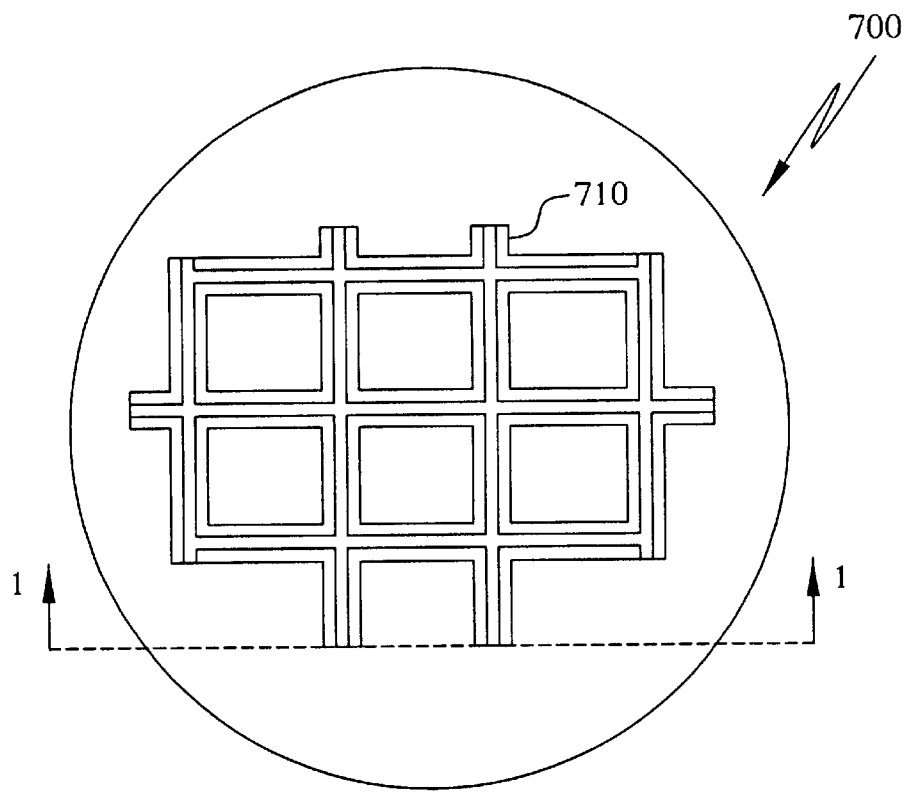
FIG. 11D is a front plan view of a molded section including a protrusion pattern extending therefrom.
Figure 11E:
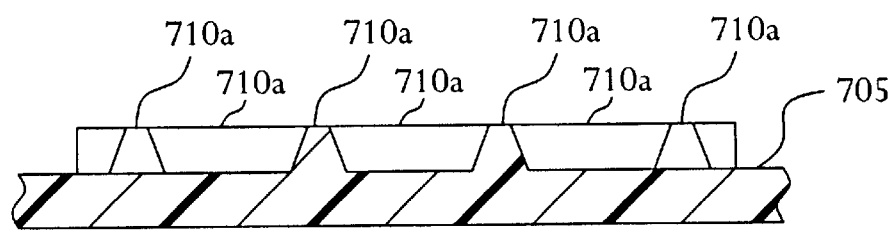
FIG. 11E is a cross sectional view of the molded section of FIG. 11D taken along lines 1—1.

FIGS. 11D, 11E, 11F, 11G, and 11H illustrate another embodiment of the present invention where at least one of the molded sections includes protrusions extending from a surface of the molded section. FIG. 11D is a front plan view of a first molded section 700. Molded section 700 includes a protrusion pattern 710 extending from a surface 705 of the molded section 700. The protrusion pattern 710 may extend in a waffle pattern as shown in FIG. 11D. FIG. 11E is a cross sectional view of the molded section 700 of FIG. 11D taken along lines 1—1. Each rib 710a forming the waffle pattern preferably narrows as it extends from the surface 705 of molded section 700.

Figure 11F:
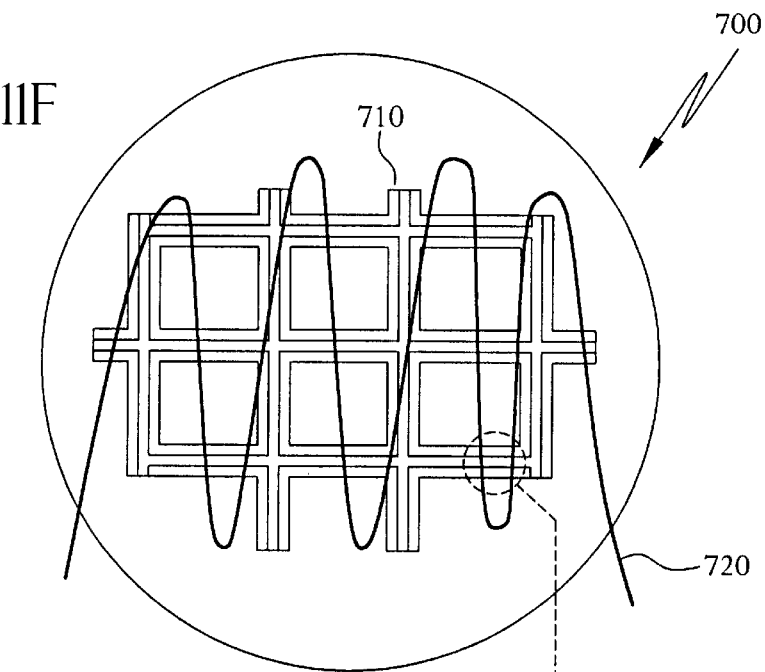
FIG. 11F is a front plan view of the molded section of FIG. 11D including a resistance wire disposed across the protrusion pattern.
Figure 11G:
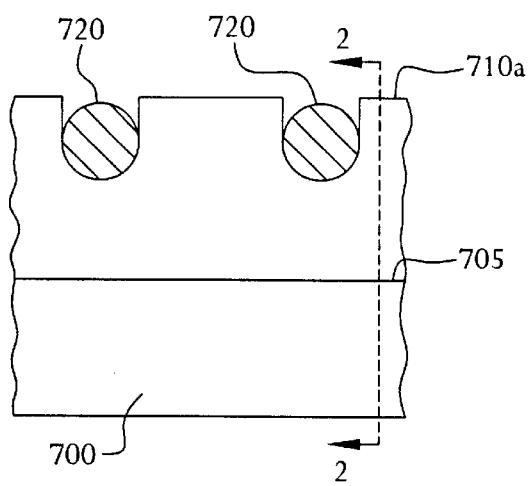
FIG. 11G is an enlarged side elevational view of a portion of FIG. 11F.
Figure 11H:
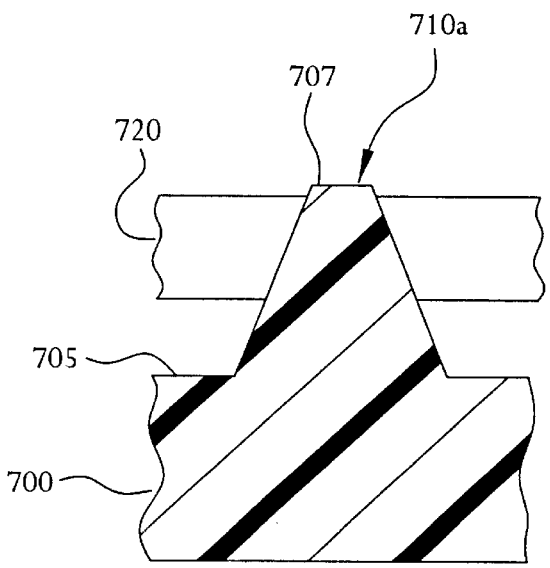
FIG. 11H is a cross sectional view of FIG. 11G taken along lines 2—2.

Referring to FIG. 11F, a resistance wire 720 extends across molded section 700, and particularly across protrusion 710. It should be understood that the resistance wire 720 is fastened to a supporting substrate in a heated element assembly, but the supporting substrate is not shown for illustrative purposes. FIG. 11G is a side elevational and cross sectional enlarged view of a portion of the resistance wire 720 and molded section 700 of FIG. 11F. FIG. 11H is a cross sectional view of FIG. 11G taken along lines 2—2. The rib 710a is designed to mechanically yield to wire 720 when molded section 700 is mated with a second molded section (not shown). This may occur, for example, by making the end 707 of the rib 710a distal from surface 705 sufficiently narrow as described above to yield to mechanical stress resulting from securing molded section 700 to a second molded section.

The resistance wire 720 is thereby secured in a selected position and pattern, in addition to being fastened to a supporting substrate (not shown). The frequency of the intersection between the ribs 710a and the resistance wire 720 may be controlled by the pattern of the protrusion 710 and the predetermined circuit path of resistance wire 720. It should be apparent that the waffle pattern shown in FIGS. 11D and 11E is one of an infinite number of patterns that may be chosen for protrusion 710 and that the resistance wire 720 may likewise be disposed in any number of patterns.

Figure 8D:
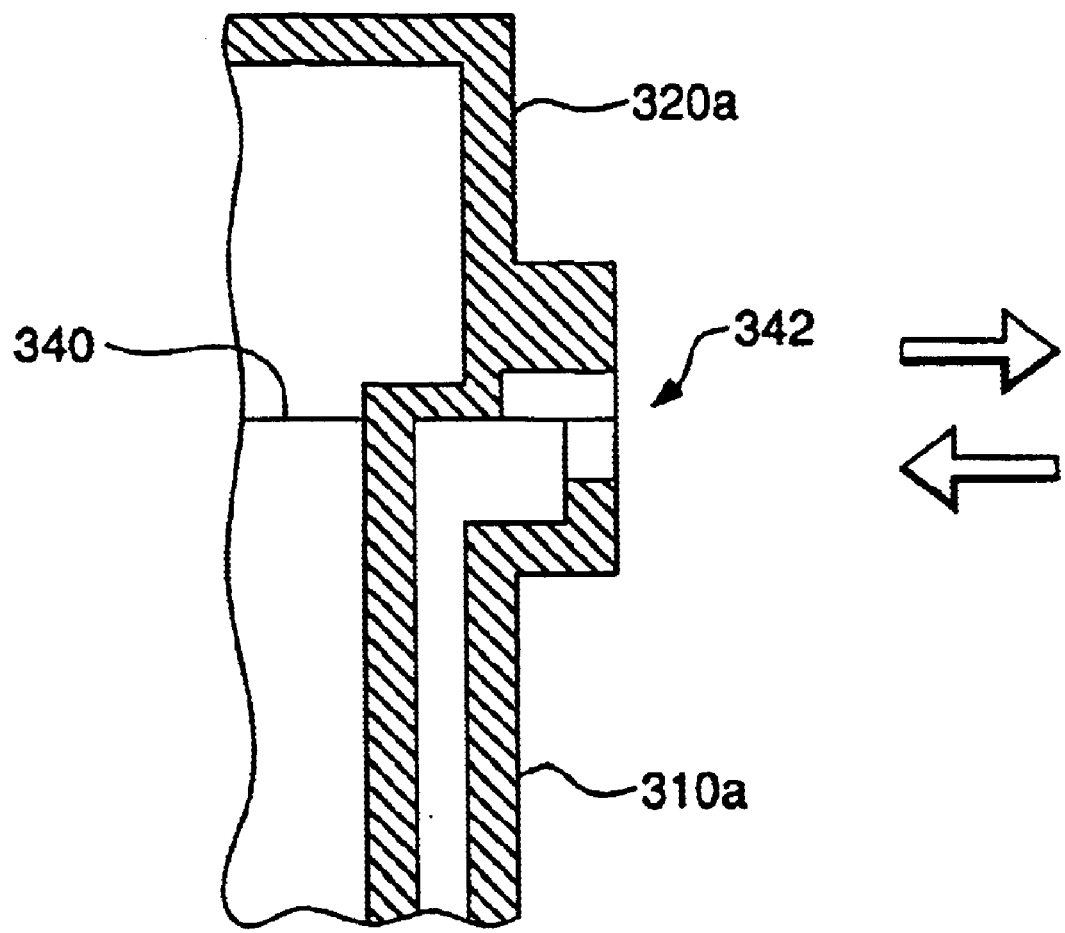
FIG. 8D is a partial, cross-sectional view of an alternative embodiment of the heated cup assembly of FIG. 8C illustrating a port formed therein.

FIG. 8D is a partial, cross-sectional view of an alternative embodiment of the heated cup assembly of FIG. 8C illustrating a port 342 formed therein. Molded polymeric sections 320a and 310a are shown mated along seem 340. A port 342 is shown formed by the molded sections at seem 340 for allowing air to be removed from the assembly and inert gas or other material to be backfilled into the into the assembly, as illustrated by the arrows shown in FIG. 8D. As shown, the port may be formed by the mating shapes of the two molded polymeric sections or (not shown) solely within the outer molded polymeric section 310a, thereby provided access to the gapped area defined between the molded sections. The port 342 may be sealed with a cork or other sealing means.

The present invention, such as embodied in the heated cup assembly 200 and heated cup assembly 300, provides several benefits. Cost effective complex assembly shapes are easily formed while accurately positioning resistance heating elements. This allows for the ability to provide heat on horizontal planes, vertical planes, and along complex contoured shapes. The supporting substrate is also capable of functioning as a thermal buffer between the resistance heating material and the polymer if so desired. Additionally, the supporting substrate serves as a mechanical stress buffer minimizing the effects of thermal expansion differences between molded section polymers and metallic resistive element materials. Further, the seam formed between the molded sections allows air to be evacuated from the area formed between the molded sections and a hermetic seal to be formed at the seam, such as by electro-fusing, spin welding, sonic welding, vibration welding, hot air welding, diffusion bonding or o-ring snap fitting the mated sections together. The heat distribution of a heated element assembly may also be improved by back-filling an inert gas, such as argon, into the area formed between the two mated sections before hermetically sealing the seam. The area may also be backfilled with an expandable foam to add further support to the substrate and serve as thermal conductor, if desired. An acceptable expandable foam is the Instapak foam formed from Part A0000-015 and Part B40WB-015 and available from Sealed Air Corporation. Alternatively, the area may be backfilled with a thermally conductive liquid to enhance heat distribution. If the liquid is also electrically conductive, the resistance heating material, such as a resistance heating wire, may be insulated from the liquid by, for example, providing an extruded resistance heating wire covered with a heat resistant plastic.

Further, in one embodiment of the present invention, the area defined between the first and second molded sections may be filled or partially filled with a UV curable material such as a resin, or epoxy, preferably while pulling vacuum. Alternatively, the supporting substrate may be soaked in the UV curable material prior to inclusion in a heated element assembly, but after fastening the resistance heating material to the supporting substrate. UV curable materials have a low viscosity before being exposed to UV radiation. In this embodiment of the present invention, the supporting substrate is preferably porous enough to permit the UV curable material to flow through the substrate. The molded sections should be formed from a polymer that is transparent to UV radiation, such as a clear polymer. After the supporting substrate, and thus the heating element, is positioned between the molded sections, the heated element assembly may be exposed to UV radiation. The UV radiation causes the UV curable material to cure and harden. In this manner, the resistance heating material is further secured in a selected position and air gaps may be replaced with a heat conductor. It should be understood that the molded sections may be designed with a sealable inlet port to facilitate the addition of the UV curable material and/or a sealable outlet port for permitting a vacuum pull.

It should also be apparent that the invention is in no way limited to a heated cup assembly as described above. Rather, designs for heated assemblies including molded sections formed to mate with each other and resistive heating elements as described above are virtually unlimited. Another exemplary embodiment of such a heated element assembly is shown in FIGS. 9A through 9E described below.

Figure 9A:
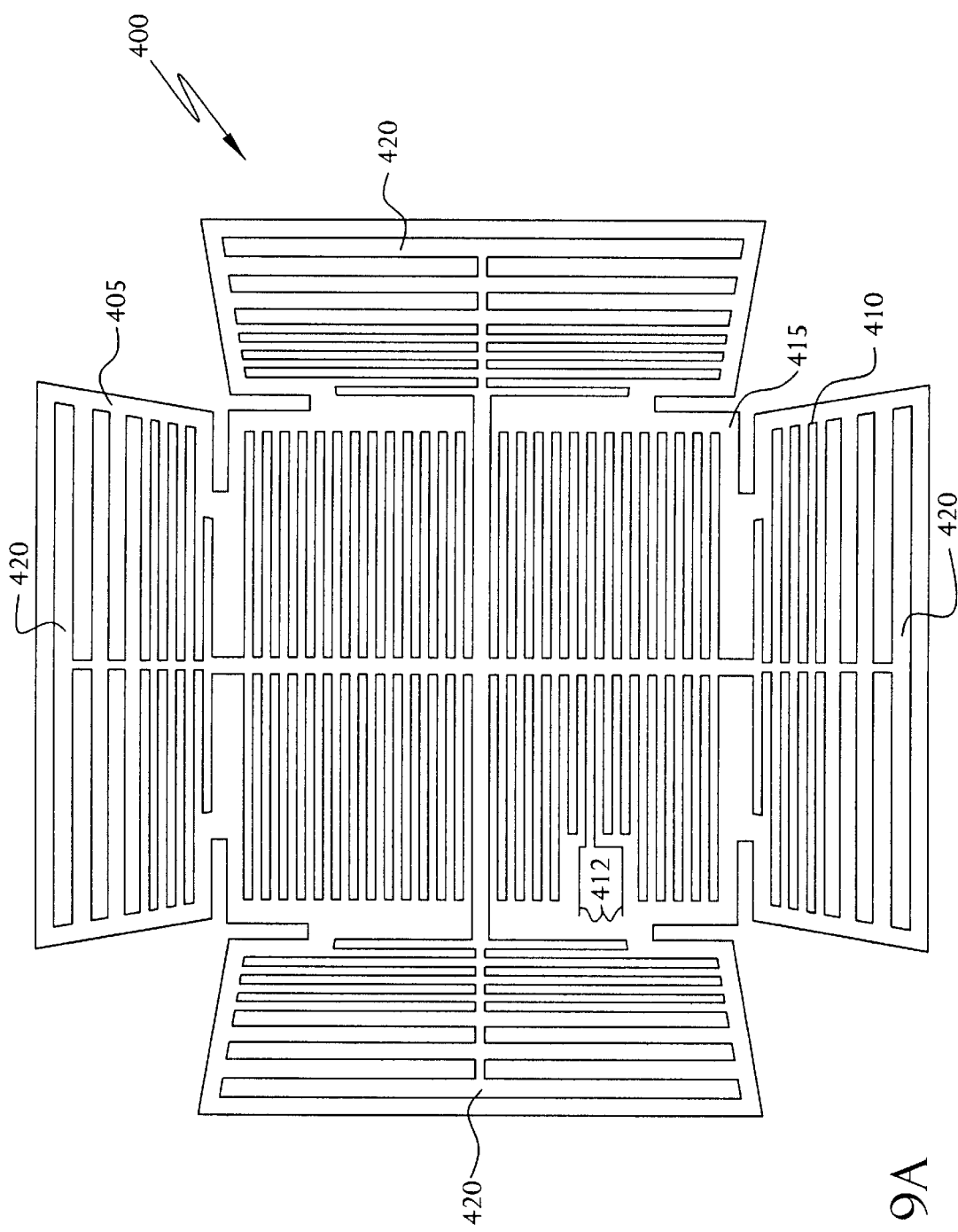
FIG. 9A is a front plan view of an element precursor for inclusion in an exemplary heated pan assembly according to the present invention.
Figure 9B:
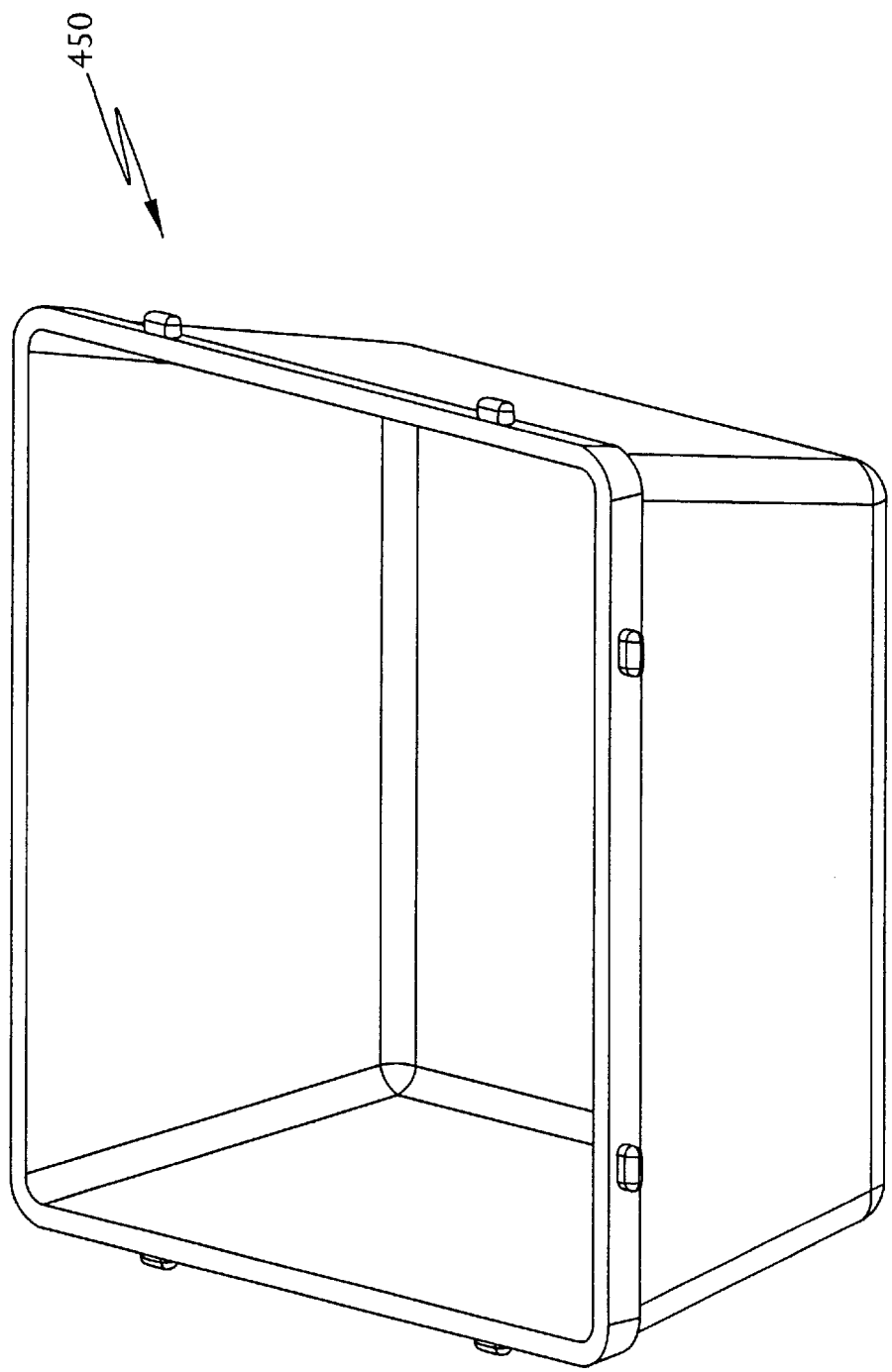
FIG. 9B is a perspective view of an exemplary first molded section of a pan according to the present invention.
Figure 9C:
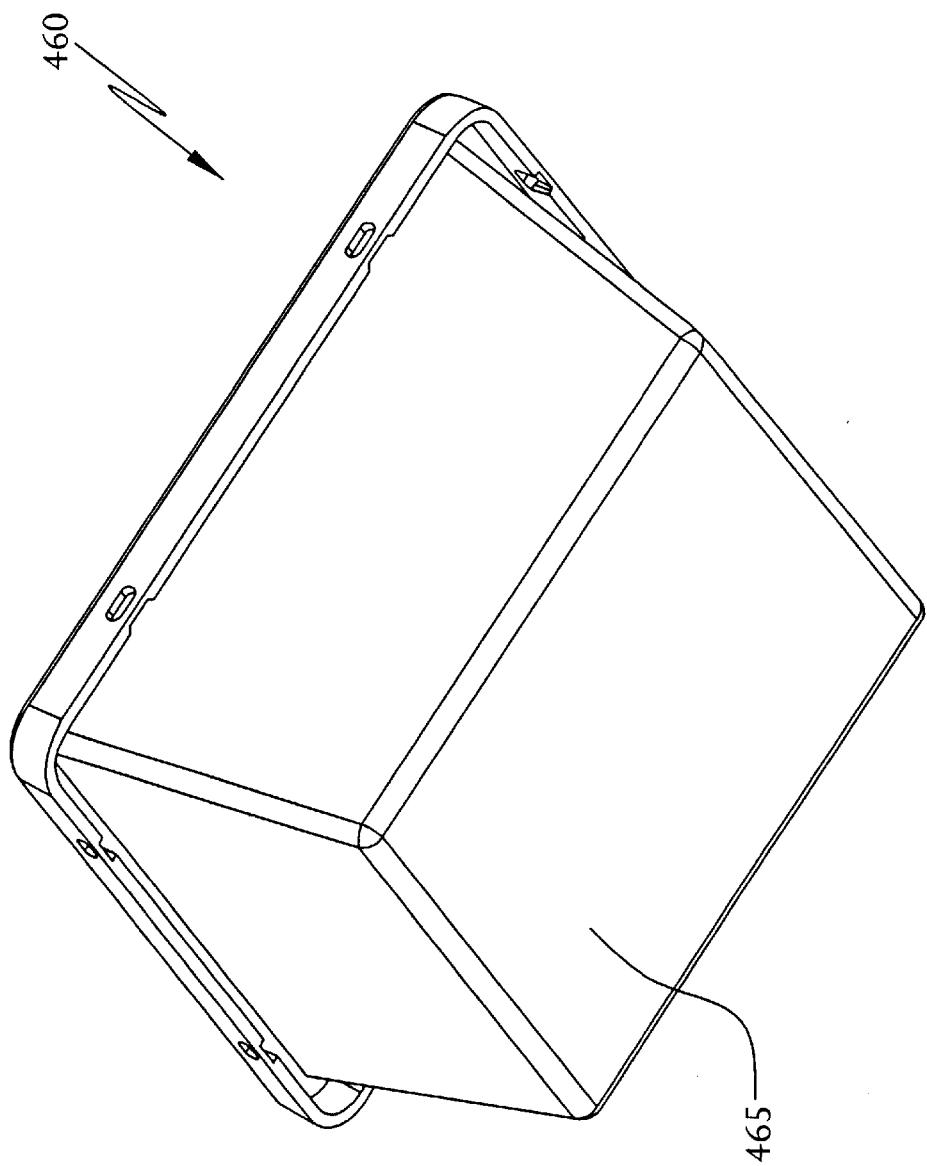
FIG. 9C is a perspective view of an exemplary second molded section of a pan for mating with the first molded section described in FIG. 9B.
Figure 9D:
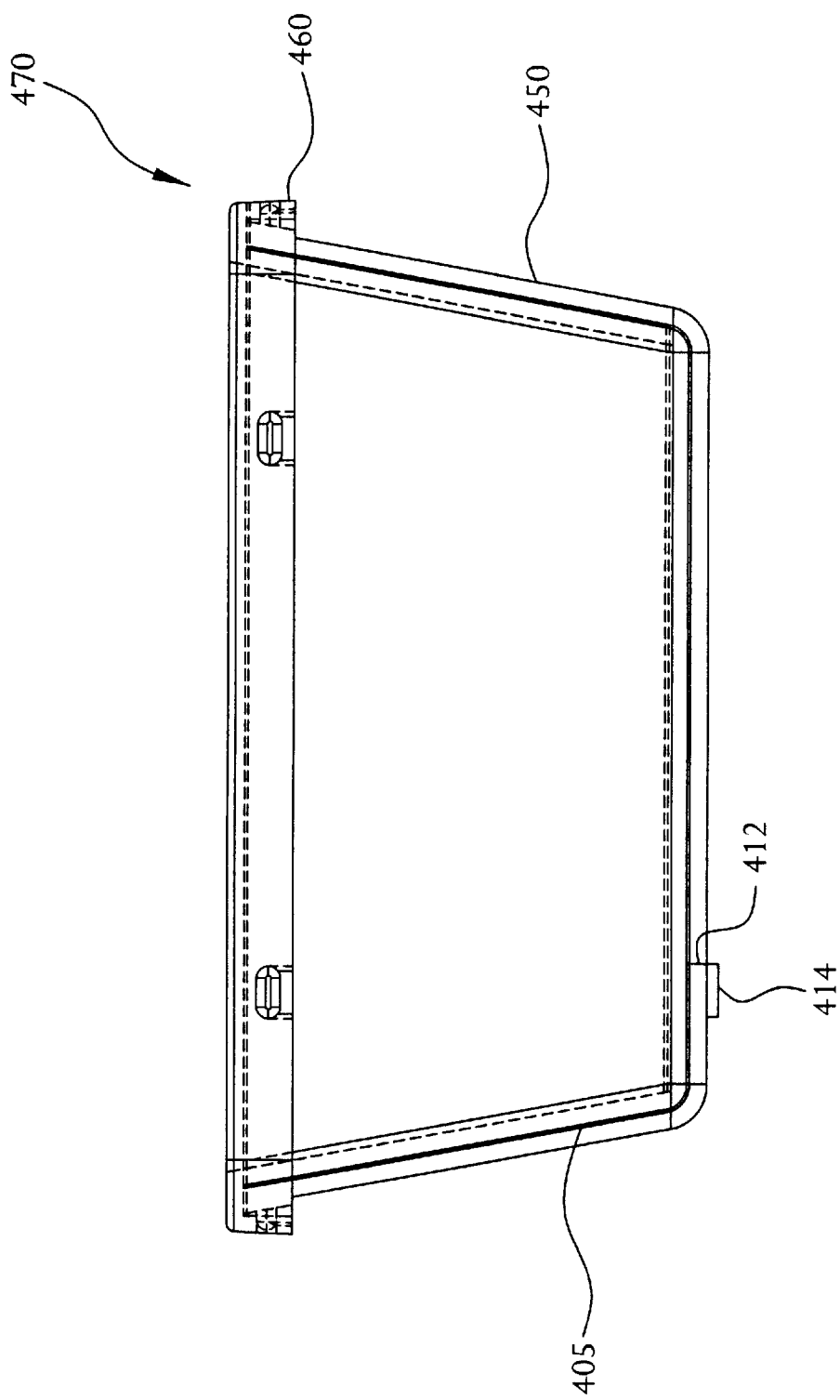
FIG. 9D is a side elevational view of an exemplary heated pan assembly shown in phantom according to the present invention.

FIG. 9A is a front plan view of a resistance heating element 400 that may be included in a heated pan assembly. The heating element 400 includes supporting substrate 405 and resistance wire 410. The supporting substrate 405 is shaped such that sides 420 may be folded away from base 415 to substantially conform to the pan shape of molded section 450 shown in FIG. 9B and molded section 460 shown in FIG. 9C. FIG. 9D illustrates in phantom that the folded heating element 400 may be placed within molded section 450 to conform to the pan shape of molded section 450. For illustrative purposes, the resistance wire 410 is not shown fastened to the supporting substrate 405, although terminal end portions 412 and external electrical connectors 414 are shown. The base 465 of molded section 460 is positioned over molded section 450 and heating element 400. Molded section 460 is secured to molded section 450 to form a heated pan assembly 470, as shown in FIGS. 9D and 9E.

Figure 9E:
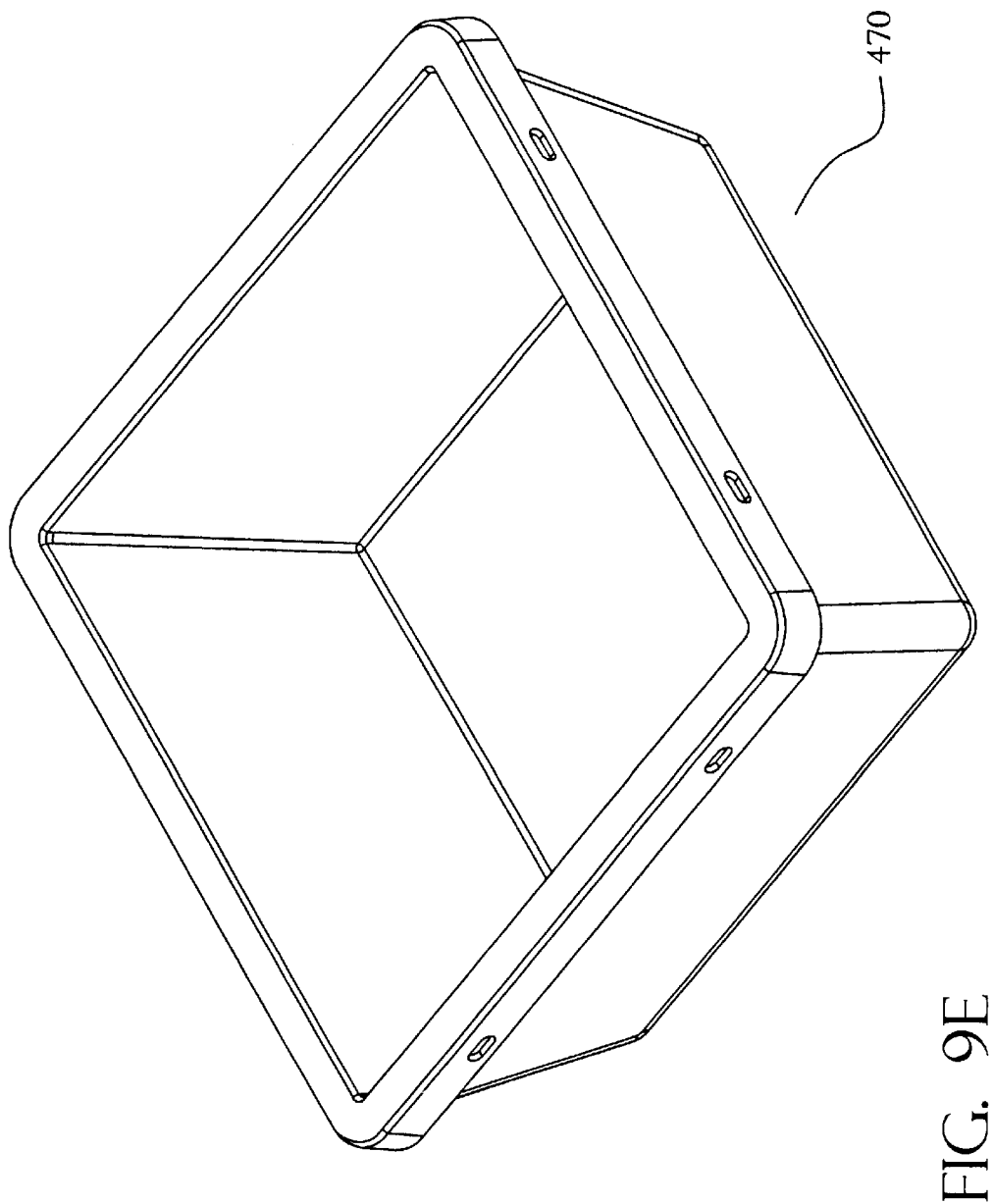
FIG. 9E is a perspective view of an exemplary heated pan assembly according to the present invention.

FIGS. 9D and 9E show a snap fit connection between molded sections 450, 460, but snap-fitting is only one manner of securing the molded sections together. For example, the molded sections 450, 460 may also be secured together to form heated element pan 470 by spin welding, melt bonding, sonic welding, vibration welding, hot air welding, diffusion bonding, O-ring snap fitting, electrofusing, or other welding techniques or combinations thereof.

Figure 12A:
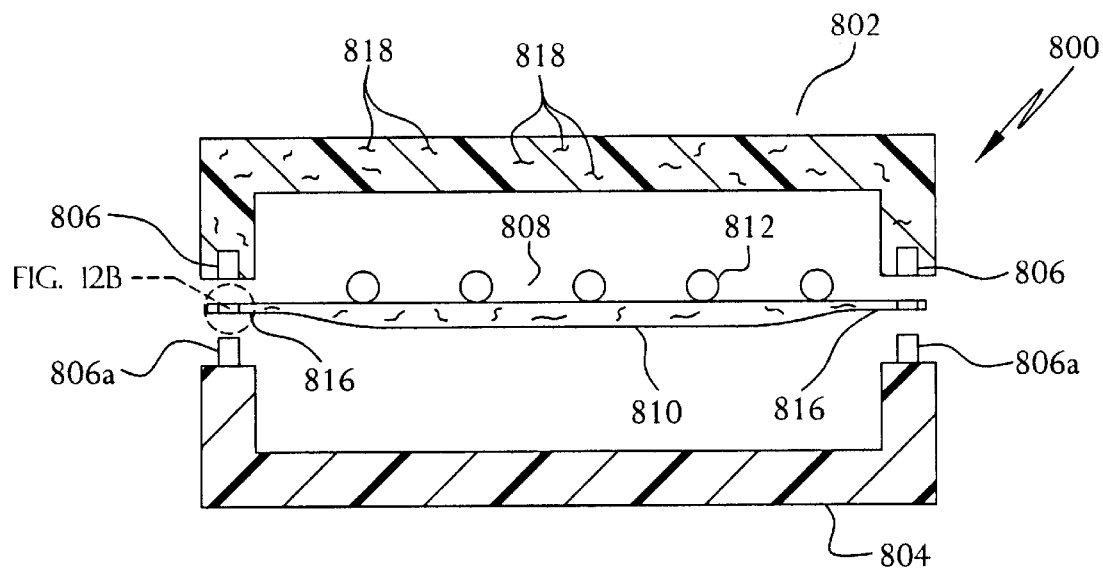
FIG. 12A is a cross sectional view of an exemplary heated element assembly according to the present invention including a suspended resistance heating element.
Figure 12B:
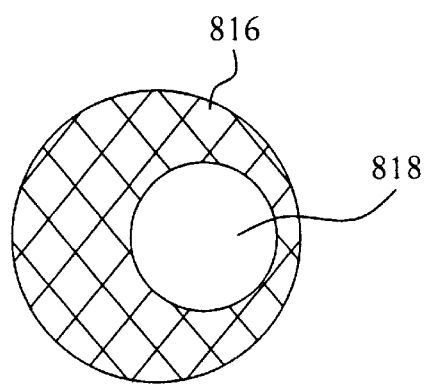
FIG. 12B is an enlarged view of a portion of the supporting substrate of the resistance heating element shown in FIG. 12A.

FIGS. 12A is an exploded view of another exemplary embodiment of a heated element assembly 800 according to the present invention. First molded section 802 and second molded section 804 are shaped to mate with each other, such as by snap recess 806 and snap fit peg 806a. Resistance heating element 808 includes supporting substrate 810 and resistance wire 812. Heating element 808 is encompassed by molded sections 802, 804 and is secured therein by an interference fit. The supporting substrate 810 is preferably secured to the molded sections 802, 804 such that the heating element 808 does not contact the molded sections 802, 804 except at edges 816. In the embodiment shown in FIGS. 12A and 12B, the edges 816 of supporting substrate 810 are formed with openings 818 to anchor the supporting substrate 810 to snap fit pegs 806a. Alternatively, snap fit pegs 806a may puncture supporting substrate 810. The supporting substrate may be further secured to the molded sections 802, 804 during welding or fusing the molded sections together at the snap fit connection.

By suspending the supporting substrate between molded sections 802, 804, less expensive and less heat resilient polymers, such as polyethylene or polypropylene, may be chosen for molded sections 802, 804. The polymer does not have to be resilient to the high heat generated at the resistance wire 812 because the resistance wire 812 does not contact molded section 802. The area between heating element 808 and molded section 802 and the air, or other gas, contained therein act as a dielectric and the heat is dissipated to a level suitable for the polymer used to form molded section 802. The area between supporting substrate 810 and/or molded sections 802, 804 may also be backfilled with an expandable foam insulator to add further support the substrate and serve as thermal buffer, if desired. Electrically and thermally conductive particles 818, such as MgO, $TiO_2$, or graphite flakes may be embedded in molded section 802 to enhance the thermal characteristics of a less expensive polymer used to construct molded section 802 without shorting the resistance wire through contact. The supporting substrate may be further secured in heating element assembly 800 by protrusions (not shown) such as described in FIGS. 11A, 11B, and 11C. The protrusions preferably contact the supporting substrate, but are disposed to avoid contact with the resistance wire 812, if electrically conductive particles 818 are included in molded section 802 or it is desired to protect the integrity of the protrusions because of polymer selection. The heating element 808 may also include a second supporting substrate as described above and shown in FIG. 11A to provide an additional thermal buffer between molded section 802 and resistance wire 812.

A heated element assembly according to the present invention may include regulating device for controlling electric current, such as, for example, a thermistor, or a thermocouple, for preventing overheating of the heated element assembly. A heated element assembly may also include a thermometer, various sensors, or other circuits, including microprocessors, fiberoptic fibers or optoelectronic devices, (LEDs, lasers) microwave devices (power amplifiers, radar) and antenna, high temperature sensors, filter, power supply devices (power transmission, motor controls) and memory chips that may be added for controlling temperature, visual inspection of environments, communications, and recording temperature cycles, for example. These secondary devices may be included on the supporting substrate, attached to a molded section, or strategically placed within the molded assembly adjacent to a heating element and secured by an interference fit by the supporting substrate, molded sections, and/or protrusions extending from the molded sections.

The above-described electrical resistance elements may be secured between two molded sections sized to mate with each other to form a heated element assembly. The molded sections may be secured to each other in a variety of manners and precision injection molding techniques allow for the production of almost unlimited designs, shapes and sizes of heating element assemblies. The molded sections may be molded polymers, metals, or ceramics. The invention is in no way limited to the aforementioned heated cup or pan assemblies, but rather includes, for example, heated shift knobs, heated throttle buttons, heated tool handles, heated handle bars, or any other molded heated articles. Although various embodiments have been illustrated, this is for the purpose of describing, but not limiting the invention. Various modifications which will become apparent to one skilled in the art, are within the scope of this invention described in the attached claims.

What is claimed is:

1. A method of manufacturing a heated element assembly, comprising the steps of:
   (a) providing a first molded polymeric section;
   (b) providing a second molded polymeric section shaped to mate with said first molded section;
   (c) providing a resistance heating element, comprising:
      (i) a first heat resistant supporting substrate having a first surface thereon;
      (ii) an electrical resistance heating material sewn with a thread to said first heat resistant supporting substrate, said electrical resistance heating material forming a predetermined circuit path having a pair of terminal end portions; and
      (iii) a pair of electrical conductors fixed to said terminal end portions of said electrical resistance heating material; and
   (d) securing said first molded polymeric section to said second molded polymeric section, such that said first and second molded sections substantially encompass said circuit path and at least a portion of said heating element is secured between said first and second molded sections by a mechanical fit between said molded sections and said electrical resistance heating material is spaced apart from said first and second molded sections by an air gap.

2. The method of claim 1, wherein the step of securing said first molded section to said second molded section includes the step of fusing or melt bonding said first molded section to said second molded section.

3. The method of claim 1, wherein the step of securing said first molded section to said second molded section includes the step of spin welding said first molded section to said second molded section.

4. The method of claim 1, wherein the step of securing said first molded section to said second molded section includes the step of sonic welding said first molded section to said second molded section.

5. The method of claim 1, wherein the step of securing said first molded section to said second molded section includes the step of snap-fitting said first molded section to said second molded section.

6. The method of claim 5, wherein the step of snap-fitting said first molded section to said second molded section includes the step of O-ring snap fitting said first molded section to said second molded section.

7. The method of claim 1, wherein said step of securing said first molded section to said second molded section includes the step of evacuating a quantity of air from an area defined between said first molded section and said second molded section and hermetically sealing said first molded section to said second molded section.

8. The method of claim 7, further comprising the step of introducing an inert gas to said area before hermetically sealing said molded sections together.

9. A method of manufacturing a heated element assembly, comprising the steps of:
    (a) providing a first molded polymeric section;
    (b) providing a second molded polymeric section shaped to mate with said first molded section;
    (c) providing a resistance heating element, comprising:
        (i) a supporting substrate having a first surface thereon; and
        (ii) an electrical resistance heating material fastened to said supporting substrate, said electrical resistance heating material forming a predetermined circuit path having a pair of terminal end portions; and
    (d) securing said first molded section to said second molded section, such that said first and second molded sections substantially encompass said circuit path and at least a portion of said heating element is secured in a gapped area defined between said first and second molded sections by a mechanical fit between said molded sections.

10. The method of claim 9, wherein the step of securing said first molded section to said second molded section includes the step of fusing or melt bonding said first molded section to said second molded section.

11. The method of claim 9, wherein the step of securing said first molded section to said second molded section includes the step of spin welding said first molded section to said second molded section.

12. The method of claim 9, wherein the step of securing said first molded section to said second molded section includes the step of sonic welding said first molded section to said second molded section.

13. The method of claim 9, wherein the step of securing said first molded section to said second molded section includes the step of snap-fitting said first molded section to said second molded section.

14. The method of claim 13, wherein the step of snap-fitting said first molded section to said second molded section includes the step of O-ring snap fitting said first molded section to said second molded section.

15. The method of claim 9, wherein said step of securing said first molded section to said second molded section includes the step of evacuating a quantity of air from said gapped area defined between said first molded section and said second molded section and hermetically sealing said first molded section to said second molded section.

16. The method of claim 15, further comprising the step of introducing an inert gas to said gapped area before hermetically sealing said molded sections together.

17. The method of claim 9, wherein the step of securing said first and second molded sections together further comprises the step of introducing a thermally conductive fluid to said gapped area defined between said first and second molded sections and forming a fluid tight seal between said first and second molded sections.

18. The method of claim 9, wherein said securing step includes the step of detachably securing said first molded section to said second molded section.

19. The method of claim 9, further comprising the step of providing an expandable foam to said gapped area defined between said first and second molded sections.

20. The method of claim 9, further comprising the steps of coating said resistance heating element with a UV curable material and curing said material after positioning said heating element between said first and second molded sections.

21. The method of claim 20, wherein the step of coating said heating element includes the step of providing said UV curable material to said gapped area defined between said first and second molded sections.

22. The method of claim 9, wherein said resistance heating element is a foldable resistance heating element, said supporting substrate having a foldable profile shaped to conform generally to a shape of said molded sections when folded, said method further comprising folding said heating element to conform generally to said shape of said molded sections.

* * * * *